(12) United States Patent
Hosoito et al.

(10) Patent No.: US 7,017,377 B2
(45) Date of Patent: Mar. 28, 2006

(54) WASHING MACHINE WITH VECTOR CONTROL FOR DRIVE MOTOR

(75) Inventors: Tsuyoshi Hosoito, Inuyama (JP);
Toshimasa Tanaka, Seto (JP); Yoji Okazaki, Yokohama (JP); Michiaki Ito, Seto (JP); Shinichiro Kawabata, Seto (JP); Kazunobu Nagai, Aichi-gun (JP); Futoshi Isono, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 431 days.

(21) Appl. No.: 10/162,207

(22) Filed: Jun. 5, 2002

(65) Prior Publication Data

US 2002/0189301 A1 Dec. 19, 2002

(30) Foreign Application Priority Data

Jun. 6, 2001 (JP) ............................. 2001-171185

(51) Int. Cl.
*D06F 33/04* (2006.01)
(52) U.S. Cl. ................................................... 68/12.16
(58) Field of Classification Search ............... 68/12.02, 68/13 R, 12.06, 12.16
See application file for complete search history.

(56) References Cited

U.S. PATENT DOCUMENTS

| 5,736,825 | A | * | 4/1998 | Kaura et al. ................. 318/599 |
| 6,029,300 | A | * | 2/2000 | Kawaguchi et al. ........... 8/159 |
| 6,163,912 | A | * | 12/2000 | Matsuura et al. .............. 8/159 |
| 6,229,719 | B1 | * | 5/2001 | Sakai et al. .................... 363/37 |

FOREIGN PATENT DOCUMENTS

| JP | 60100405 | 5/1985 |
| JP | 02246473 | 9/1990 |
| JP | 06055025 | 3/1994 |

* cited by examiner

*Primary Examiner*—Joseph L. Perrin
(74) *Attorney, Agent, or Firm*—Pillsbury Winthrop Shaw Pittman LLP

(57) ABSTRACT

A washing machine includes an electric motor developing torque used for wash, rinse and dehydration operations, a current detector detecting current flowing into the motor, and a torque controller performing a vector control for the motor on the basis of the current detected by the current detector so that the torque developed by the motor is optimum for at least each of the wash and dehydration operations.

8 Claims, 21 Drawing Sheets

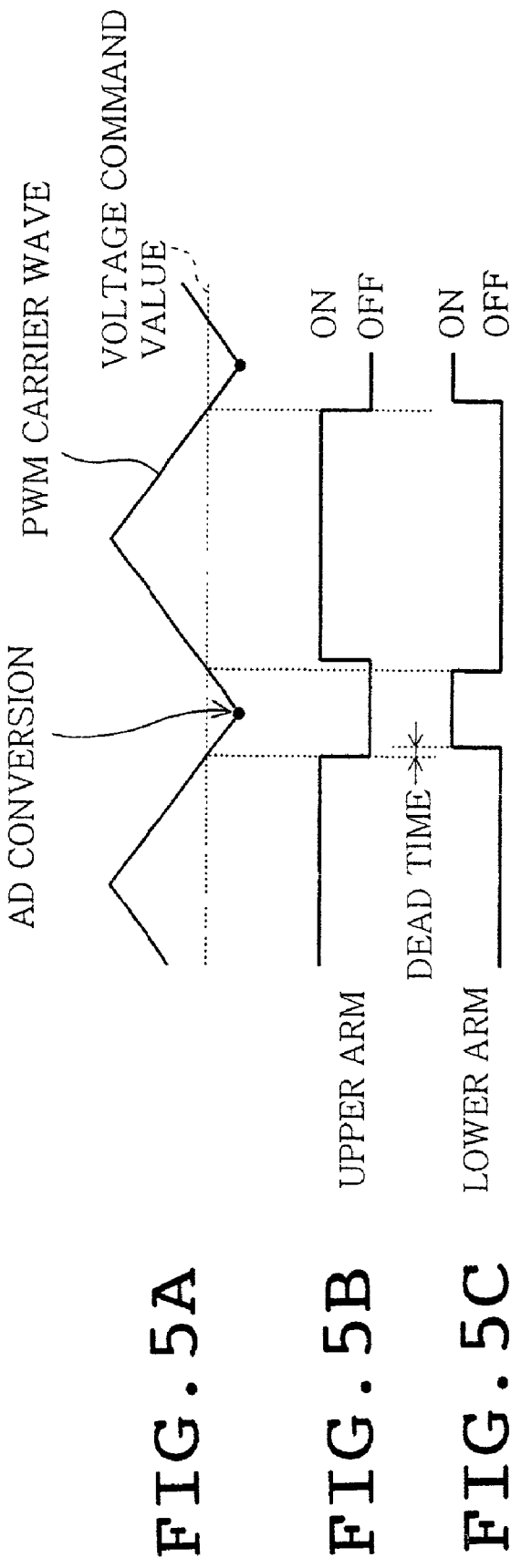

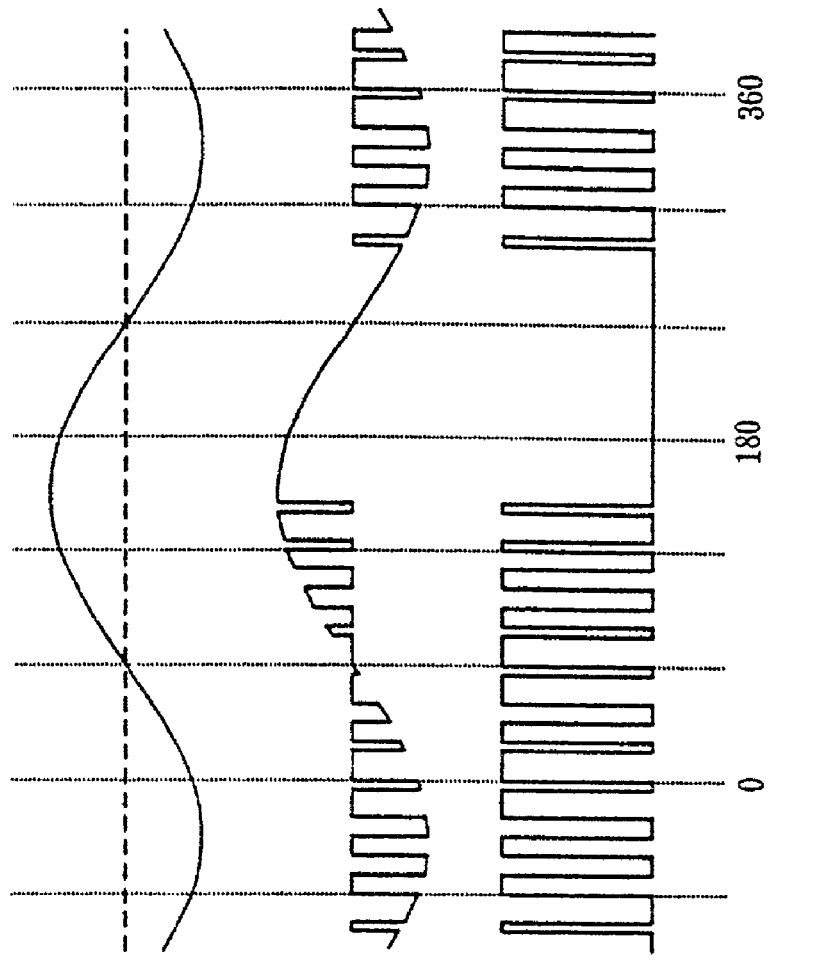
FIG. 6A  $I_{MINV}$
FIG. 6B  $I_{SR}$
FIG. 6C  PHASE VOLTAGE
FIG. 6D  ELECTRICAL ANGLE (deg)

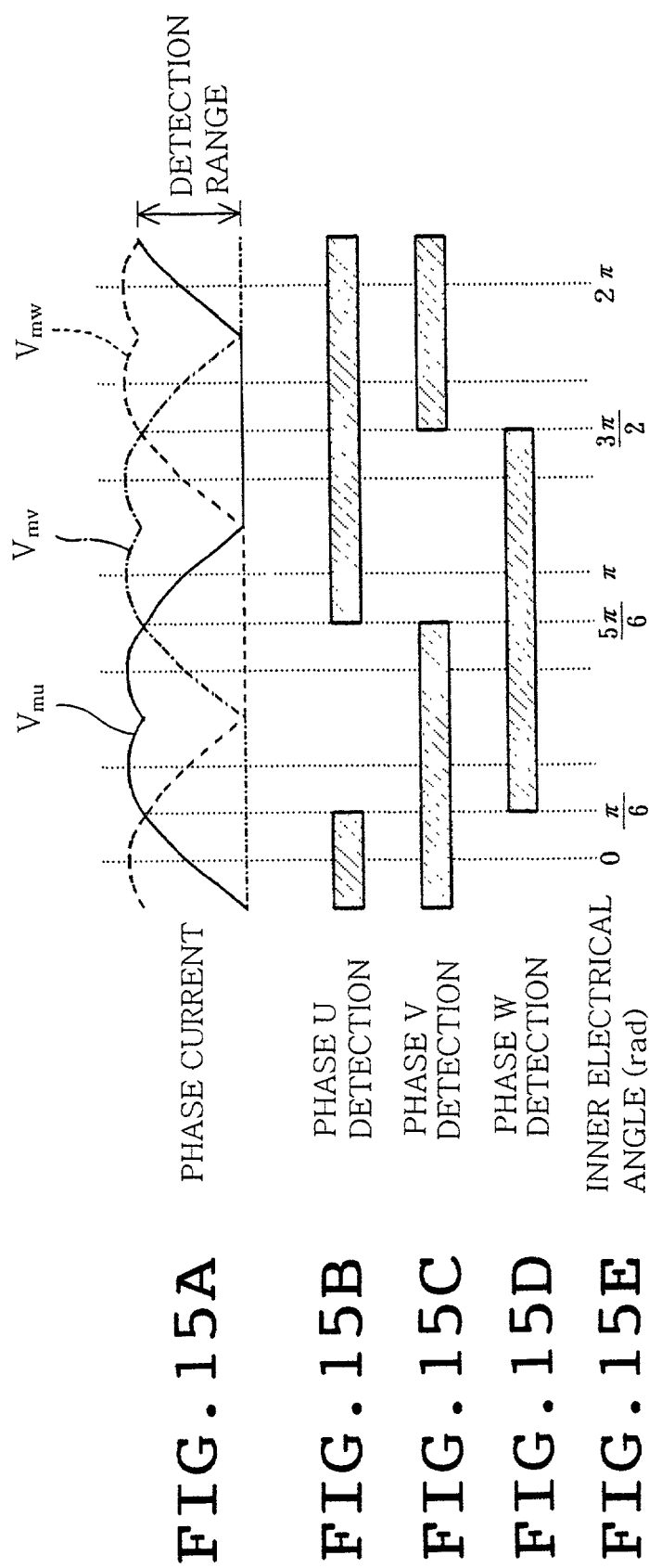

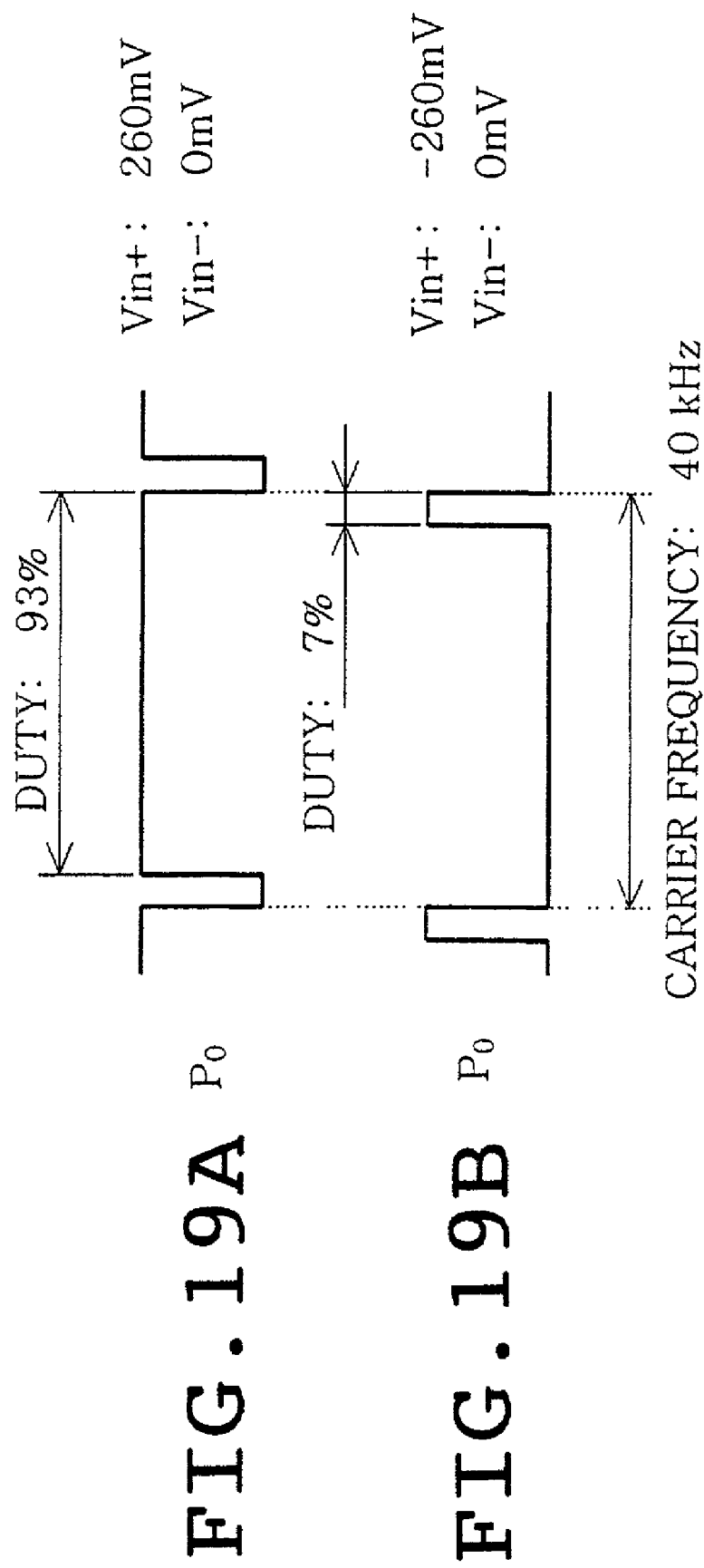

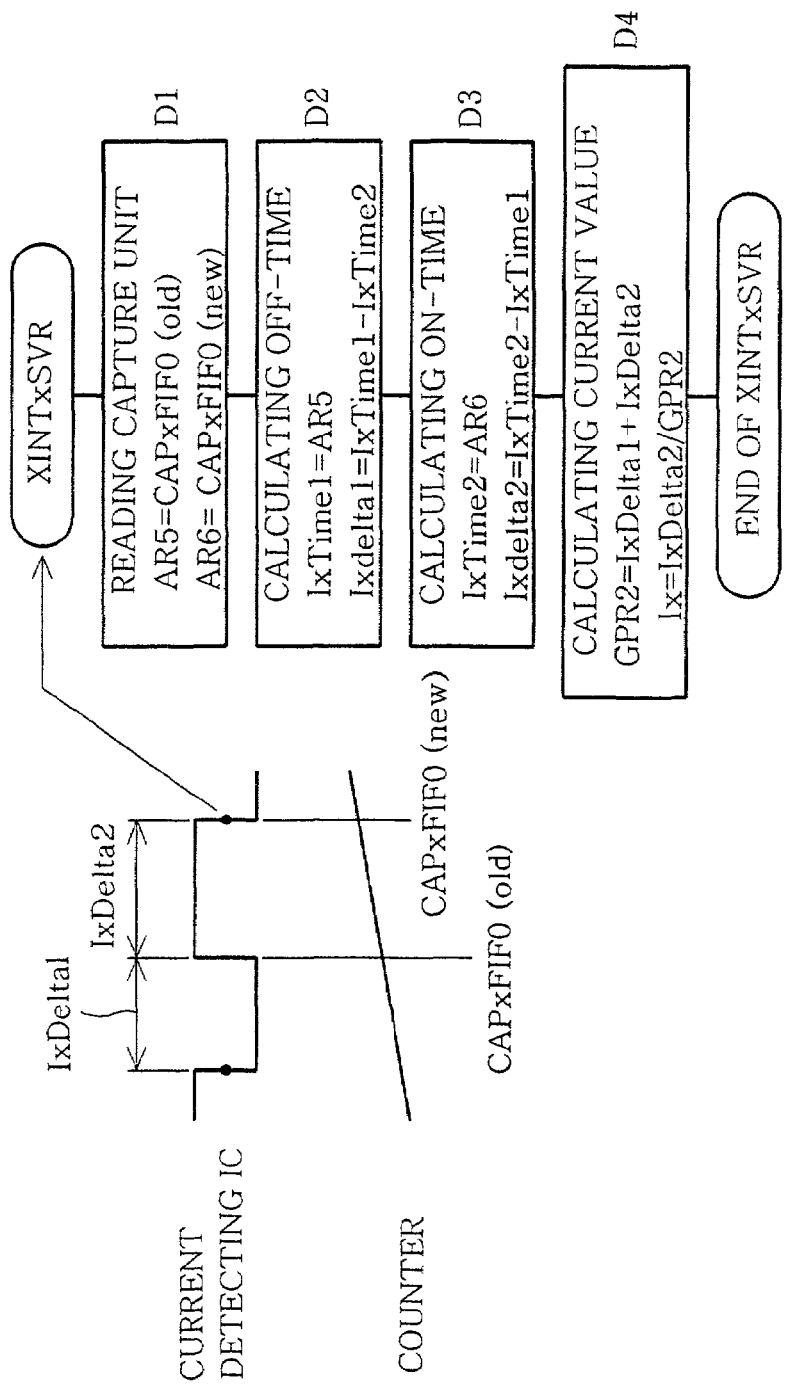

WASHING MACHINE WITH VECTOR CONTROL FOR DRIVE MOTOR

BACKGROUND OF THE INVENTION

1. Field of the Invention

This invention relates to a washing machine provided with a control device executing torque control for an electric motor developing torque used to carry out wash, rinse and dehydration operations.

2. Description of Related Art

Automatic washing machines have conventionally been provided which comprise a brushless DC motor driving an agitator (or pulsator) and a rotating tub in a wash step and only the rotating tub in a rinse step and a dehydration step. An inverter circuit is provided for driving the brushless DC motor in many types of the above-mentioned washing machines. Voltage applied to the motor is increased or decreased so that torque developed by the motor is controlled according to a driving condition of the motor.

FIG. 22 shows an example of control system for a three-phase drive motor of the aforementioned conventional automatic washing machine. The control system is composed of a microcomputer, for example and includes functional blocks of PI (proportional-integral) control 1, wash pattern output section 2, UVW converter 3, initial pattern output section 4, pulse width modulation (PWM) signal generator 5, position detector 6 and the like. The PWM signal generator 5 delivers PWM signals of respective phases to an inverter circuit 8 driving an electric motor 7. A Hall sensor 9 is incorporated in the motor 7 for detecting a position of a rotor. The Hall sensor 9 carries out position detection for two (U and V) of three phases, delivering position signals to the position detector 6.

The PI control 1 performs PI control for a rotational speed of the motor 7 on the basis of a target speed command $\omega_{ref}$ in a dehydrating operation and a detected speed $\omega$ of the motor 7. A control for controlling an operation of the washing machine delivers the target speed command $\omega_{ref}$ to the PI control 1, whereas the control delivers the detected speed $\omega$ to the PI control 1. The PI control 1 delivers a duty command and a phase command for a PWM signal to the UVW converter 3. The wash pattern output section 2 delivers a duty command and a phase command in a wash operation to the UVW converter 3, instead of the PI control 1. The UVW converter 3 converts the commands delivered from the PI control 1 or the wash pattern output section 2, into voltage commands of the respective phases U, V and W, delivering the voltage commands to the PWM signal generator 5. The initial pattern output section 4 delivers a 120-degree energization pattern signal to the inverter circuit 8, instead of the UVW converter 3, when the motor 7 starts from a stopped state.

The above-described control system has the following problems. A rotational speed of the motor 7 is proportional to torque developed. However, the developed torque is not proportional to the voltage when the control is performed by increasing or decreasing the applied voltage as described above. As a result, a difference is likely to occur between the target speed command $\omega_{ref}$ and the detected speed $\omega$, whereupon the control becomes unstable. Furthermore, since a motor speed variation is increased in the wash operation (0.2 seconds from 0 to 150 rpm, for example), the PI control cannot be applied to the wash operation and accordingly, the PI control 1 needs to be switched to the wash pattern output section 2.

Furthermore, the inverter circuit 8 includes upper and lower arm side switching elements such as insulated gate bipolar transistors (IGBTs). A short-circuit current flows when both arm side switching elements are simultaneously turned on. A simultaneous off time or a dead time is provided in order that the short-circuit current may be prevented. In the dead time, the switching elements of both arms are simultaneously turned off when the elements are switched between the on state and off state. As the result of provision of the dead time, the current supplied from the inverter circuit 8 to each phase winding of the motor 7 undergoes waveform modulation.

A minimum time needs to be ensured as the dead time. Accordingly, an adverse effect on the output current waveform becomes larger as a carrier wave frequency for the pulse width modulation is increased. For example, 6 µs is required for on and off times in order that a dead time of 3 µs may be ensured. A ratio of the dead time to a carrier wave period is 3% when the carrier wave frequency for the pulse width modulation is at 5 kHz (period of 200 µs). The ratio is 10% when the carrier wave frequency is at 16 kHz (period of 62.5 µs). The carrier wave frequency is generally set at or above 10 kHz in the washing machines so that an audible noise produced by a pulse width modulated wave is reduced. Consequently, an increase in the adverse effect of the dead time upon the output current waveform cannot be avoided. More specifically, the modulation due to the dead time distorts the output voltage of the inverter circuit 8 and accordingly the output current waveform. The distortion of the output current waveform results in variations in the developed torque. Consequently, a cogging torque is developed with rotation of the motor, resulting in noise and vibration or oscillation.

SUMMARY OF THE INVENTION

Therefore, an object of the present invention is to provide a washing machine in which the motor torque control is performed more precisely so that a further reduction in noise or vibration can be attained.

The present invention provides a washing machine comprising an electric motor developing torque used for wash, rinse and dehydration operations, a current detector detecting current flowing into the motor, and a torque controller performing a vector control for the motor on the basis of the current detected by the current detector so that the torque developed by the motor is optimum for at least each of the wash and dehydration operations.

Since the torque controller performs the vector control, it can directly control the motor torque while the motor torque is in proportion to a q-axis current. Accordingly, this control manner can improve the responsibility as compared with the conventional motor control manners, and noise and vibration or oscillation can be reduced.

In a preferred form, the washing machine further comprises a speed controller provided at a stage previous to the torque controller for performing a PI control for a motor speed on the basis of a speed command and a speed of the motor obtained from the current detected by the current detector. In this preferred form, a predetermined rotational speed can be obtained by the PI control even when a motor load varies. Consequently, a washing power of the washing machine can be stabilized.

Furthermore, the speed controller delivers q-axis and d-axis current command values to the torque controller, and the torque controller performs a PI control on the basis of the q-axis and d-axis current command values and q-axis and d-axis current values of the motor obtained from the current detected by the current detector, thereby generating q-axis and d-axis voltage command values. In this preferred form, torque required to achieve a predetermined speed can readily be obtained.

BRIEF DESCRIPTION OF THE DRAWINGS

Other objects, features, and advantages of the present invention will become clear upon reviewing the following description of embodiments, made with reference to the accompanying drawings, in which:

FIGS. 5A, 5B and 5C show a PWM carrier waveform, and upper and lower arm side gate signal waveforms respectively;

FIGS. 6A to 6D are waveform charts showing the relationship among inversion $I_{MINV}$ of motor phase current, current $I_{SR}$ flowing into a shunt resistor and phase voltage;

FIGS. 15A to 15E are graphs showing phase voltages, and timing for detection of phase currents;

FIGS. 19A and 19B show waveform charts of a PWM signal delivered by a current detector IC;

FIGS. 20A and 20B are waveform charts of a PWM signal delivered by a current detector IC and changes in a count value of a counter provided in DSP of the control section;

FIG. 21 is a flowchart showing calculation processing performed by DSP; and

DETAILED DESCRIPTION OF THE INVENTION

Figure 1:
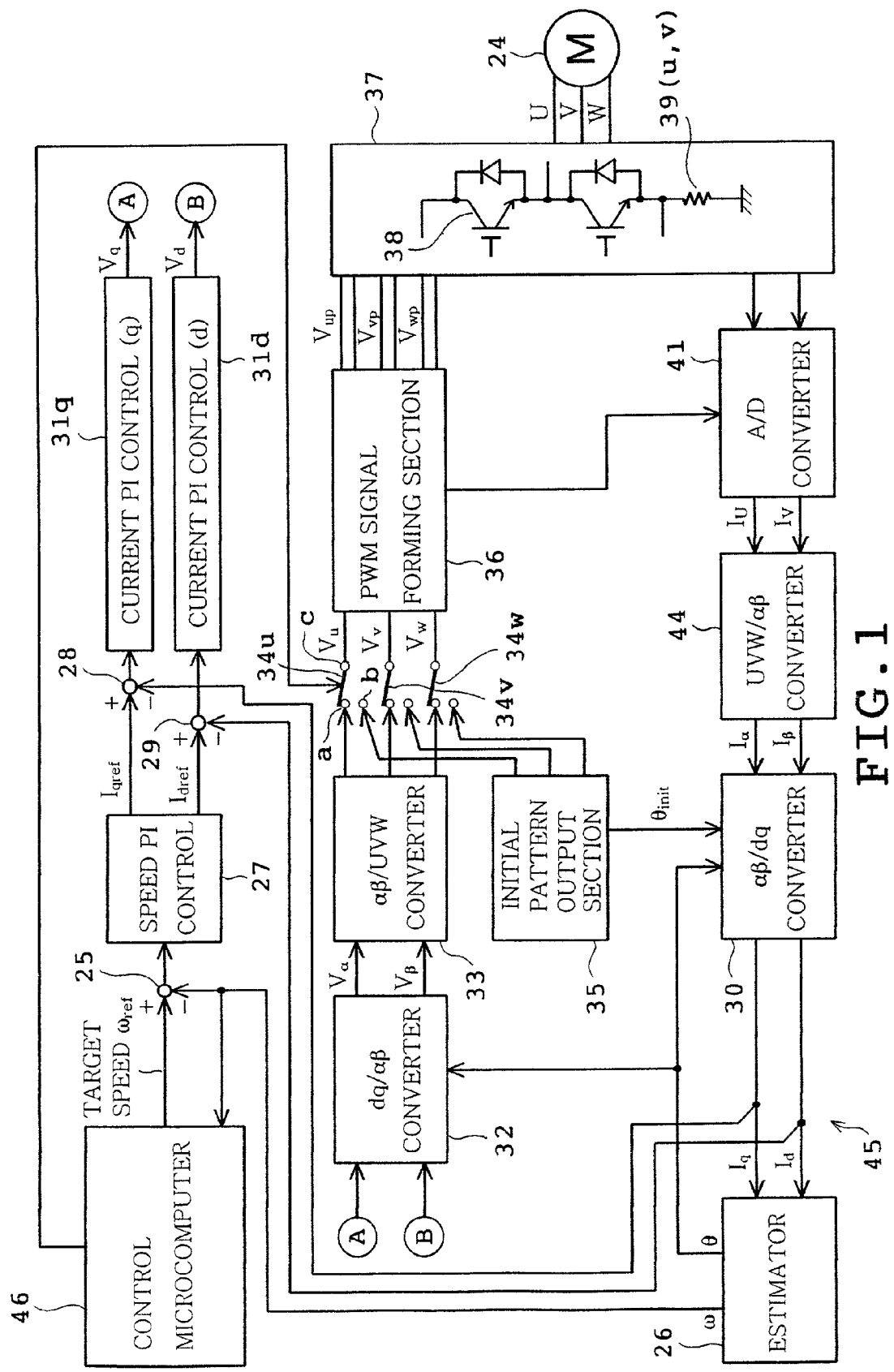
FIG. 1 is a block diagram showing a control system employed in an automatic washing machine of a first embodiment in accordance with the present invention.

Several embodiments of the invention will be described with reference to the accompanying drawings. The invention is applied to a vertical axis type automatic washing machine in the embodiments. Identical or similar parts are labeled by the same reference symbols throughout the embodiments. FIGS. 1 to 12 illustrate a first embodiment of the invention. Referring to FIG. 3, an overall construction of the automatic washing machine 11 is shown. The washing machine 11 comprises a generally rectangular box-shaped outer cabinet 12 and a stationary water-receiving tub 13 elastically supported by four elastic suspension mechanisms 14 in the cabinet 12. Each suspension mechanism 14 includes a suspension rod 14a having an upper end mounted on an upper portion of the cabinet 12 and a coil spring 14b mounted on a lower end of the suspension rod 14a. An amount of vibration or oscillation produced during a washing operation can be prevented from transmission to the cabinet 12.

A rotating tub 15 serving as a wash tub and a dehydration tub is rotatably mounted in the water-receiving tub 13. An agitator (pulsator) 16 is rotatably mounted on the bottom of the rotating tub 15. The rotating tub 15 includes a tub body 15a, an inner cylinder 15b mounted inside the tub body and a balance ring 15c mounted on upper ends of the tub body and inner cylinder. The tub body 15a has a number of dehydration holes 15d formed in an upper portion thereof. Upon rotation of the tub 15 at high speeds in a dehydration step, a centrifugal force raises water along an inner circumferential wall of the cylinder 15b. The water is then discharged through the dehydration holes 15d into the water-receiving tub 13. The bottom of the rotating tub 15 has a hole 17 communicating via a drain passage 17a with a drain hole 18. A drain valve 19 is provided in a drain passage 20 connected to the drain hole 18. Accordingly, when water is supplied into the rotating tub 15 with the drain valve 19 closed, the water is stored in the rotating tub. When the drain valve 19 is opened, the water stored in the rotating tub 15 is discharged through the drain passage 17a, drain hole 18 and drain passage 20. The bottom of the water-receiving tub 13 has an auxiliary drain hole 18a connected to a connecting hose (not shown) to bypass the drain valve 19. The auxiliary drain hole 18a is further connected to the drain passage 20. Water discharged into the water-receiving tub 13 upon rotation of the tub 15 is further discharged through the auxiliary drain hole 18a.

A mechanism housing 21 is mounted on the underside of the water-receiving tub 13. A hollow tub shaft 22 is rotatably mounted on the mechanism housing 21. The rotating tub 15 is connected to the tub shaft 22. An agitator shaft 23 is rotatably mounted in the tub shaft 22. The agitator 16 is connected to an upper end of the agitator shaft 23. The agitator shaft 23 has a lower end connected to a rotor 24a of a brushless DC motor 24 of the outer rotor type. The brushless motor 24 directly drives the agitator 16 alternately in opposite directions in a wash step. On the other hand, the tub shaft 12 and the agitator shaft 13 are coupled by a clutch (not shown) so that the motor 24 directly drives the rotating tub 15 and agitator 16 in one direction. Accordingly, a rotational speed of the motor 24 is approximately equal to a rotational speed of the agitator 16 in the wash step and to rotational speeds of the tub 15 and agitator 16 in the dehydration step.

Referring now to FIG. 1, an electrical arrangement of the control system of the washing machine is shown. In FIG. 1, coordinate, ($\alpha$, $\beta$), represents a rectangular coordinate system obtained by orthogonal conversion of a three-phase coordinate system of three phases of the brushless motor 24 separated from each other by an electrical angle of 120 degrees. Coordinate, (d, q), represents a coordinate system of a secondary magnetic flux revolved with rotation of the rotor 24a.

A target speed command $\omega_{ref}$ is supplied as a subtracted value to a subtracter 25. An estimator 26 detects a rotational speed $\omega$ of the motor 24. The detected speed $\omega$ is supplied as a subtracting value to the subtracter 25. A control microcomputer 46 is provided for controlling an overall operation of the washing machine 11. The target speed command $\omega_{ref}$ is generated by the microcomputer 46. A result of the subtraction by the subtracter 25 is supplied to a speed PI control 27. The speed PI control 27 performs a PI control on the basis of the target speed command $\omega_{ref}$ and the detected speed $\omega$, thereby generating a quadrature axis (q-axis) current command value $I_{qref}$ and a direct axis (d-axis) current command value $I_{dref}$. Both current command values $I^{qref}$ and $I_{dref}$ are supplied as subtracted values to subtracters 28 and 29 respectively. The d-axis current command value $I_{dref}$ is set at 0 in a wash or rinse operation and at a predetermined value for a field-weakening control in a dehydration step. An $\alpha\beta$/dq converter 30 generates a q-axis current value $I_q$ and a d-axis current value $I_d$, both of which are supplied as subtracting values to the subtracters 28 and 29 respectively. Results of the subtraction by the subtracters 28 and 29 are supplied to current PI controls 31q and 31d respectively.

The current PI controls 31q and 31d perform a PI control on the basis of a difference between the q-axis and d-axis current command values $I_{qref}$ and $I_{dref}$, thereby generating a q-axis voltage command value $V_q$ and a d-axis voltage command value $V_d$, respectively. The q-axis and d-axis voltage command values $V_q$ and $V_d$ are supplied to a dq/$\alpha\beta$ converter 32. The estimator 26 detects a rotation phase angle $\theta$ of the secondary magnetic flux of the motor 24 (a position angle of the rotor). The rotation phase angle $\theta$ is supplied to the dq/$\alpha\beta$ converter 32, which converts the voltage command values $V_q$ and $V_d$ to voltage command values $V_\alpha$ and $V_\beta$ on the basis of the rotation phase angle $\theta$.

The voltage command values $V_\alpha$ and $V_\beta$ obtained by the dq/$\alpha\beta$ converter 32 are supplied to an $\alpha\beta$/UVW converter 33, which converts the voltage command values $V_\alpha$ and $V_\beta$ to three-phase voltage command values $V_u$, $V_{v1\ and\ Vw}$. The three-phase voltage command values are supplied to one fixed contacts 34ua, 34va and 34wa of three change-over switches 34u, 34v and 34w respectively. An initial pattern output section 35 supplies starting voltage command values $V_{us}$, $V_{vs}$ and $V_{ws}$ to the other fixed contacts 34ub, 34vb and 34wb of the change-over switches 34u, 34v and 34w respectively. The change-over switches 34u, 34v and 34w further has movable contacts 34uc, 34vc and 34wc connected to input terminals of a PWM signal forming section 36 respectively.

The PWM signal forming section 36 modulates a carrier wave of 16 kHz on the basis of the voltage command values $V_{us}$, $V_{vs}$ and $V_{ws}$ to obtain PWM signals $V_{up}$ (+, −), $V_{vp}$(+, −) and $V_{wp}$(+, −) for the respective phases. The PWM signals $V_{up}$(+, −), $V_{vp}$(+, −) and $V_{wp}$(+, −) are supplied to an inverter circuit 37. In order that sinusoidal current may be supplied to phase windings 24u, 24v and 24w (see FIG. 2) of the motor 24, each of the PWM signals $V_{up}$, $V_{vp}$ and $V_{wp}$ has a pulse width corresponding to voltage amplitude based on a sine wave.

Figure 2:
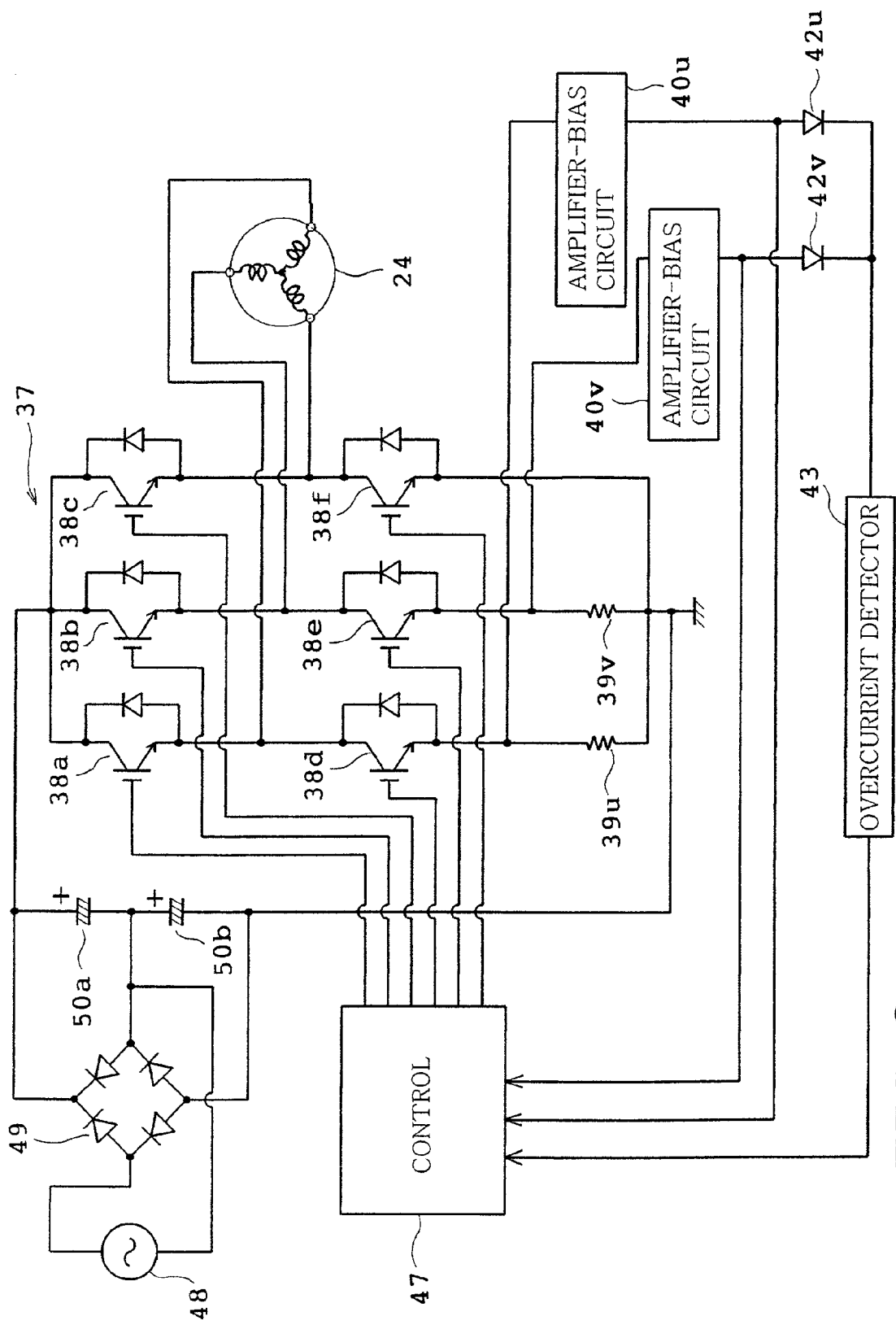
FIG. 2 is a circuit diagram showing a detailed electrical arrangement of an inverter circuit.
Figure 3:
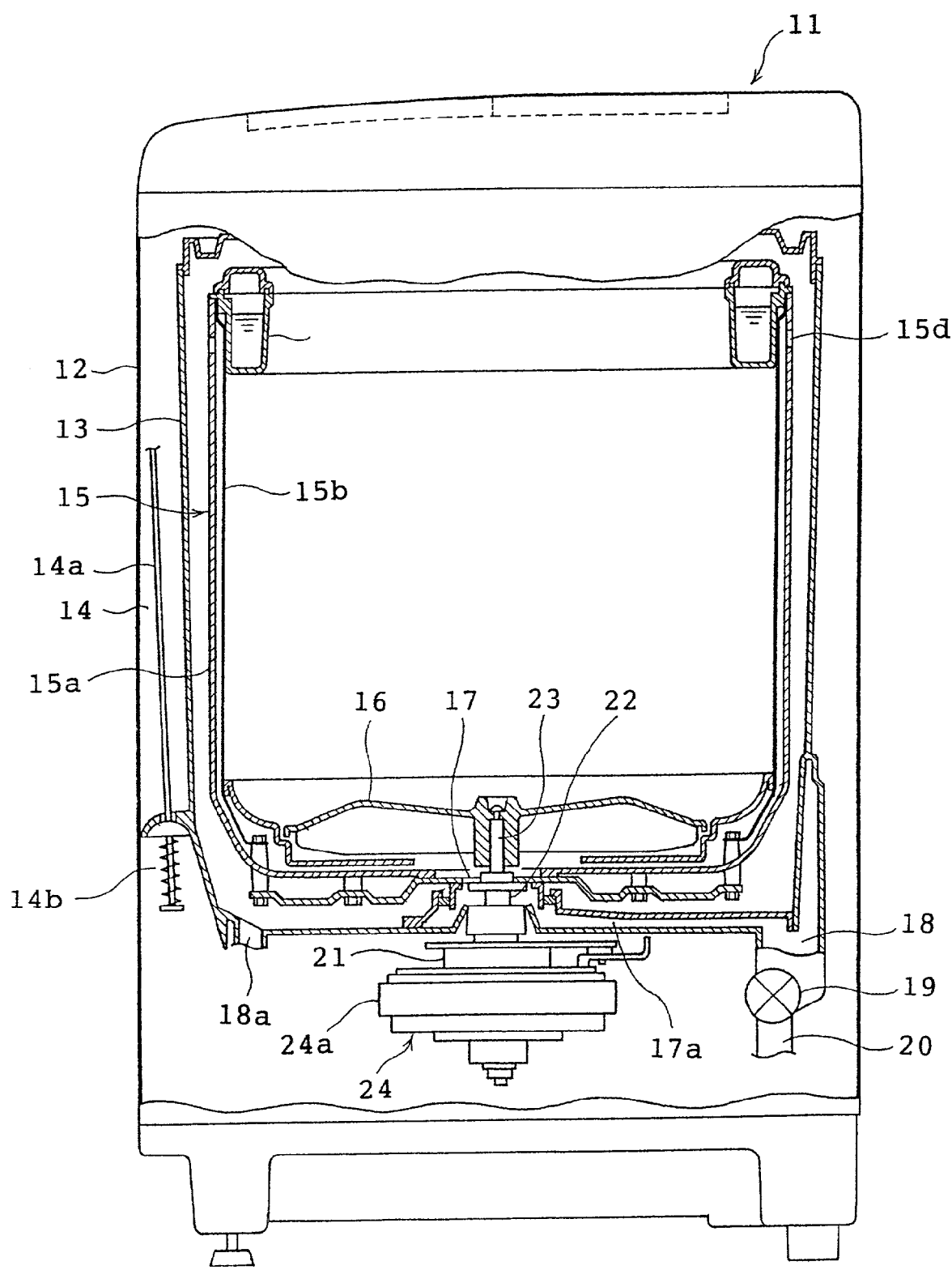
FIG. 3 is a longitudinal section of the overall washing machine.

Referring to FIG. 2, the inverter circuit 37 includes six IGBTs 38a to 38f connected into a three-phase bridge configuration. The IGBTs serve as switching elements. Lower arm side IGBTs 38d and 38e have emitters grounded via current-detecting shunt resistors 39u and 39v (current detectors) respectively. Common nodes of the IGBTs 38d and 38e are connected via respective amplifier-bias circuits 40u and 40v to an A/D converter 41 (FIG. 1) serving as a current detector. Each shunt resistor has a resistance value of about 0.1Ω.

The amplifier-bias circuits 40u and 40v comprise respective amplifiers, amplifying terminal voltage of the shunt resistors 39u and 39v and biasing the amplified voltage so that resultant amplified signals each range in the positive side, for example, 0 to +5 V. The amplifier-bias circuits 40u and 40v have output terminals connected via diodes 42u and 42v in common to an input terminal of an overcurrent detector 43, respectively.

The overcurrent detector 43 refers to levels of output signals of the amplifier-bias circuits 40u and 40v to detect an overcurrent having flowed through any one of the phases. Upon detection of the overcurrent, the overcurrent detector 43 delivers an overcurrent signal to a control 47 including a control microcomputer 46 and DSP 45 which will be described later, thereby interrupting drive of the motor 24 by the inverter circuit 37. Phase W current can indirectly be estimated on the basis of the phase U and V currents. Furthermore, a full-wave rectifier circuit comprising a diode bridge and two serially connected capacitors 50a and 50b (voltage-doubler, full-wave rectifier) rectify voltage of 100 V from an AC power supply 48 so that a DC voltage of about 280 V is obtained. The obtained voltage is applied to the inverter circuit 37.

Returning to FIG. 1, an A/D converter 41 performs analog-to-digital conversion of the output signals of the amplifier-bias circuits 40u and 40v, thereby delivering current data $I_u$ and $I_v$ to a UVW/$\alpha\beta$ converter 44. The UVW/$\alpha\beta$, converter 44 estimates a phase W current from the current data $I_u$ and $I_v$ and converts three-phase current data $I_u$, $I_v$ and $I_w$ into biaxial current data $I_\alpha$ and $I_{62}$ of the orthogonal coordinates system according to the following equation (1):

$$\begin{bmatrix} I_\alpha \\ I_\beta \end{bmatrix} = \begin{bmatrix} \cos(0) & \cos(2\pi/3) & \cos(4\pi/3) \\ \sin(0) & \sin(2\pi/3) & \sin(4\pi/3) \end{bmatrix} \begin{bmatrix} I_u \\ I_v \\ I_w \end{bmatrix} \quad (1)$$

The UVW/$\alpha\beta$ converter 44 then delivers the biaxial current data $I_\alpha$ and $I_\beta$ to an $\alpha\beta$/dq converter 30. The $\alpha\beta$/dq converter 30 obtains a positional angle $\theta$ of the motor rotor from the estimator 26 to convert the biaxial current data $I_\alpha$ and $I_\beta$ to d-axis current value $I_d$ and q-axis current value $I^q$ on a rotating coordinate system (d, q) according to the following equation (2):

$$\begin{bmatrix} I_d \\ I_q \end{bmatrix} = \begin{bmatrix} \cos\theta & \sin\theta \\ -\sin\theta & \cos\theta \end{bmatrix} \begin{bmatrix} I_\alpha \\ I_\beta \end{bmatrix} \quad (2)$$

The $\alpha\beta$/dq converter 30 delivers the d-axis current value $I_d$ and the q-axis current value $I^q$ to the estimator 26 and subtracters 28 and 29. Based on the d-axis and q-axis current values $I_d$ and $I_q$, the estimator 26 estimates a position angle θ of the rotor 24a and rotational speed ω, delivering them to respective sections. In the starting of the motor 24, the direct current excitation is performed by the initial pattern output section 35 so that the rotational position of the rotor 24a is initialized. Thereafter, a starting pattern is applied so that forced commutation is carried out. The position angle θ is apparent in the forced commutation and accordingly, estimation is unnecessary. The αβ/dq converter 30 calculates current values $I_d$ and $I^q$ with a position angle $θ_{init}$ serving as an initial value. The position angle $θ_{init}$ is obtained from the initial pattern output section 35 immediately before start of the vector control.

After start of the vector control, the estimator 26 starts up to estimate the position angle θ and rotational speed ω of the motor rotor 24a. In this case, when the rotor position angle the estimator 26 delivers to the αβ/dq converter 30 is $θ_n$, the estimator estimates the rotor position angle $θ_n$, based on the rotor position angle $θ_{n-1}$ estimated by the vector calculation on the basis of the current values $I_d$ and $I_q$, and the rotor position angle $θ_{n-2}$ estimated one period before.

The foregoing arrangement except for the inverter circuit 37, amplifier-bias circuit 40, diode 42 and overcurrent detector 43 is mainly realized by software of DSP (digital signal processor) 45 serving as torque controller. A current control period is set so as to be an inverse of the frequency of PWM carrier wave, whereas a speed control period is set at 1 ms. Furthermore, the control microcomputer 46 causes DSP 45 to start the vector control or supplies the target speed command $ω_{ref}$ to DSP 45.

Figure 22:
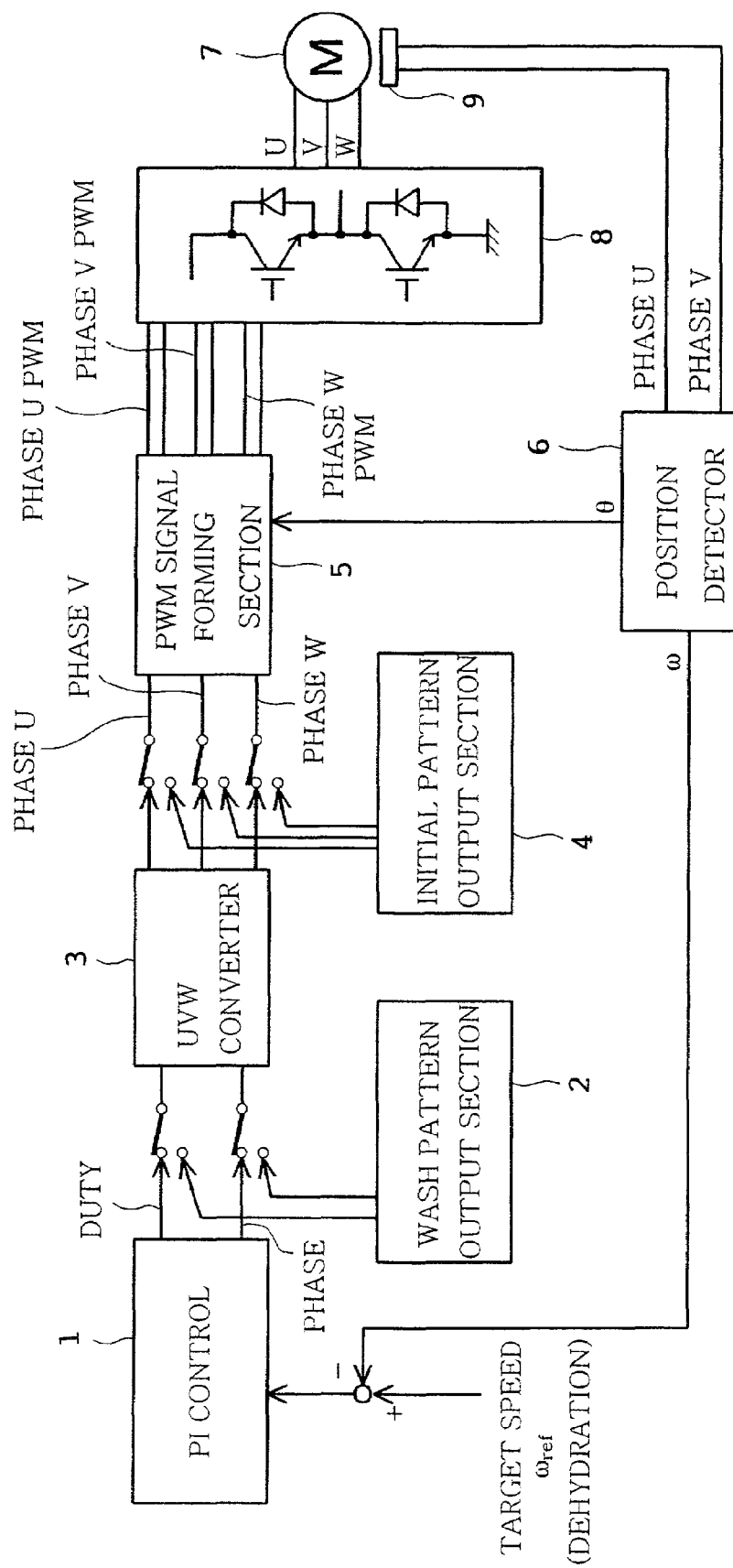
FIG. 22 is a block diagram similar to FIG. 1, showing the prior art.

In the embodiment, upon start of the motor 24, the PI control which is similar to that in the prior art is temporarily carried out before start of the vector control. Accordingly, the PI control 1 and UVW converter 3 as shown in FIG. 22 are provided in parallel with each other in the foregoing arrangement. Actually, the voltage commands $V_u$, $V_{v1\ and\ Vw}$ delivered by the UVW converter 3 are switched by the change-over switch 34 to be delivered to the PWM signal forming section 36.

Figure 4:
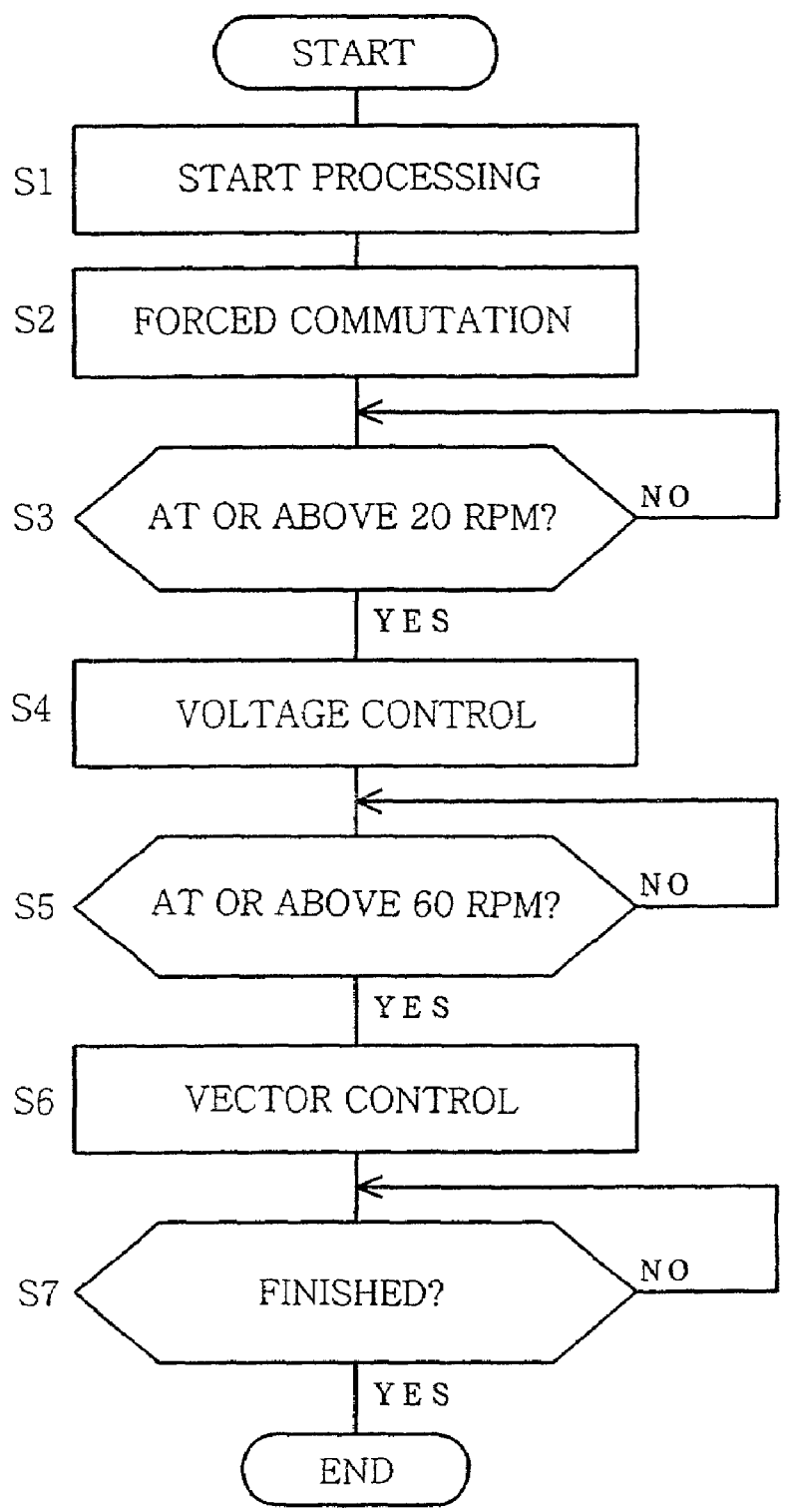
FIG. 4 is a flowchart schematically showing control contents of a control microcomputer.

The operation of the washing machine will now be described with reference to FIGS. 4 to 12. Referring to FIG. 4, the control contents of the control microcomputer 46 is shown. The control microcomputer 46 carries out the foregoing start processing (step S1) when the wash operation starts, for example. More specifically, movable contacts 34uc to 34wc of the change-over switches 34u to 34w are connected to fixed contacts 34ub to 34wb respectively so that the initial pattern output section 35 performs the direct current excitation. The rotational position of the rotor 24a is initialized and thereafter, the voltage command values $V_{us}$ to $V_{ws}$ are applied to the inverter circuit 37 so that the forced commutation takes place in the motor 24 (step S2). Consequently, the motor 24 starts rotating and the rotational speed thereof is gradually increased.

When determining that the motor speed has reached 20 rpm, on the basis of a signal supplied from the initial pattern output section 35 (YES at step S3), the change-over switches 34u to 34w are changed over so that the movable contacts 34uc to 34wc are connected to the fixed contacts 34ub to 34wb respectively. The microcomputer 46 then starts delivering the target speed command $ω_{ref}$ thus performing the voltage control (PI control) by the arrangement similar to that of the prior art (step S4). In other words, it is difficult to perform the vector control with high precision in a low speed range. The microcomputer 46 then refers to the rotational speed ω supplied from the estimator 26 to determine whether the motor speed has reached 60 rpm (step S5). When determining that the motor speed has reached 60 rpm (YES at step S5), the microcomputer 46 starts the vector control (step S6). Thereafter, the microcomputer 46 continues the operation of the washing machine until receives the instruction of operation stop (step S7).

The processing in the vector control after step S6 will be described. The PWM signal forming section 36 includes an internal up-down counter (not shown) generating a PWM carrier wave of 16 kHz. When a count value of the up-down counter has reached "0" or a trough of a triangular wave, the PWM signal forming section 36 delivers a conversion timing signal to the A/D converter 41. See FIGS. 5A to 5C. The PWM signal forming section 36 compares the levels of the voltage command values $V_u$ to $V_w$ delivered by the αβ/UVW converter 33 with the level of the PWM carrier wave. The PWM signal forming section 36 delivers the PWM signals $V_{up}(+)$, $V_{vp}(+)$ and $V_{wp}(+)$ so that the IGBTs 38a to 38c of the upper arm side are turned on in a period when the level of the PWM carrier wave is higher than those of the voltage command values $V_u$ to $V_w$. The IGBTs 38d to 38f of the lower arm side are turned on with a dead time between ON and OFF periods in a period when the IGBTs 38a to 38c of the upper arm side are turned off.

Referring to FIGS. 6A to 6D, the relationship is shown among inversion IMINV of motor phase current, current ISR flowing into the shunt resistor 39 and phase voltage. The IGBT 38 of the lower arm side is turned on so that the phase voltage is at 0 V in a period when the current ISR flows. Accordingly, the trough of the triangular wave shows an intermediate phase of the period when the IGBTs 38d to 38f are turned on. In other words, the phase current flowing into the lower arm side of the inverter circuit 37 can reliably be sampled when the A/D converter 41 performs the A/D conversion at the time when the count value of the PWM signal forming section 38 is 0.

The current values $I_u$ and $I_v$ converted by the A/D converter 41 are supplied through the UVW/αβ and αβ/dq converters 44 and 30 together with the estimated current value $I_w$ to be converted to biaxial current data $I_α$ and $I_β$ and further to biaxial current data $I_d$ and $I_q$. The biaxial current data are delivered to the estimator 26 and the subtracters 28 and 29 so that the position angle θ and the rotational speed ω are estimated by the estimator. The current $I_q$ flows in a direction perpendicular to the direction of the secondary magnetic flux of the motor 24 and serves for torque development. On the other hand, the current $I_d$ flows in a direction in parallel with the direction of the secondary magnetic flux and does not serve for torque development.

The speed PI control 27 delivers q-axis and d-axis current command values $I_{qref}$ and $I_{dref}$ on the basis of the difference between the target speed command $ω_{ref}$ and the detected speed ω. The current PI controls 31q and 31d deliver voltage command values $V_q$ and $V_d$ on the basis of the differences between the command values $I_{qref}$ and $I_{dref}$ and the detected current values $I_q$ and $I_d$ respectively. The dq/αβ converter 32 and αβ/UVW converter 33 convert the voltage command values $V_q$ and $V_d$ to voltage command values $V_u$, $V_v$ and $V_w$, the latter being delivered to the PWM signal forming section 36. The PWM signal forming section 36 delivers PWM signals $V_{up}$, $V_{vp}$ and $V_{wp}$ to the inverter circuit 37. As a result, the motor phase windings 24u to 24w are energized.

Figure 7A:
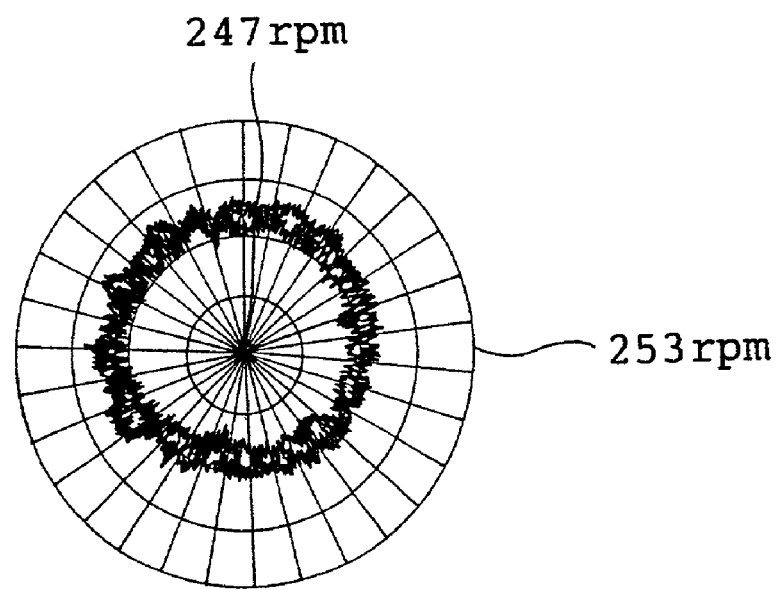
FIGS. 7A and 7B show variations in the rotational speed in the case where a rotating tub of the washing machine is rotated at 250 rpm in the embodiment and in the prior art respectively.
Figure 7B:
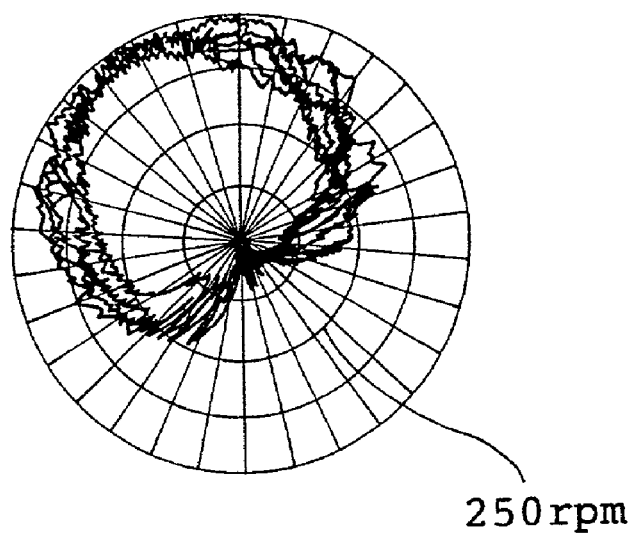

Referring to FIGS. 7A and 7B, variations are shown in the rotational speed in the case where a rotating tub 15 is rotated at 250 rpm in the embodiment and in the prior art respectively. The center of each circle denotes the speed of 250 rpm and a diametrical direction of each circle denotes the magnitude of rotational speed. A circumferential direction of each circle denotes a rotational position of the tub 15. An addition of laundry and water weighing 16 kg is accommodated as load in the tub 15. Two fluid balancers weighing 400 g and 300 g are provided at the upper and lower ends of the tub 15 respectively.

The case of the prior art as shown in FIG. 7B has a periodicity in which the speed variations are linked with the rotational angle. The rotational speed varies so as to be one-sided to a large extent with respect to a specific rotational position. The maximum variational difference is about 6 rpm. On the other hand, in the embodiment as shown in FIG. 7A, the rotational speed is maintained substantially at 250 rpm over the rotational position. The maximum variational difference is about 1 rpm. Consequently, the rotational variations can effectively reduced in the embodiment.

Although FIG. 4 illustrates the case where the wash operation starts, the flowchart of FIG. 4 may be applied to a dehydration operation. In the dehydration operation, the control manner is switched from the voltage control to the vector control when the rotational speed of the tub 15 exceeds 60 rpm. The speed of 60 rpm corresponds to the natural frequency of 1 Hz of the suspension rod 14a of each suspension mechanism 14 elastically supporting the tub 15. Accordingly, the amplitude by vibration reaches a peak thereof when the rotational speed of the tub 15 corresponds with the natural frequency of the suspension rod 14a. However, when laundry is distributed non-uniformly in the tub 15 such that the tub is in the unbalanced condition, its amplitude by vibration is increased. In view of this, the variations in the rotational speed can be reduced as much as possible when the vector control and the PI control are performed in a low speed range of the dehydration operation for the control of the rotational speed of the tub 15. Consequently, the vibration caused at about 60 rpm by the tub 15 can effectively be reduced, which can prevent noise and vibration from being transmitted to the floor of the room where the washing machine is installed. In particular, the foregoing arrangement can reduce noise and vibration due to a thump caused when the tub 15 collides with an inner wall of the cabinet 11 and vibration caused by swinging of the tub 15.

Figure 8:
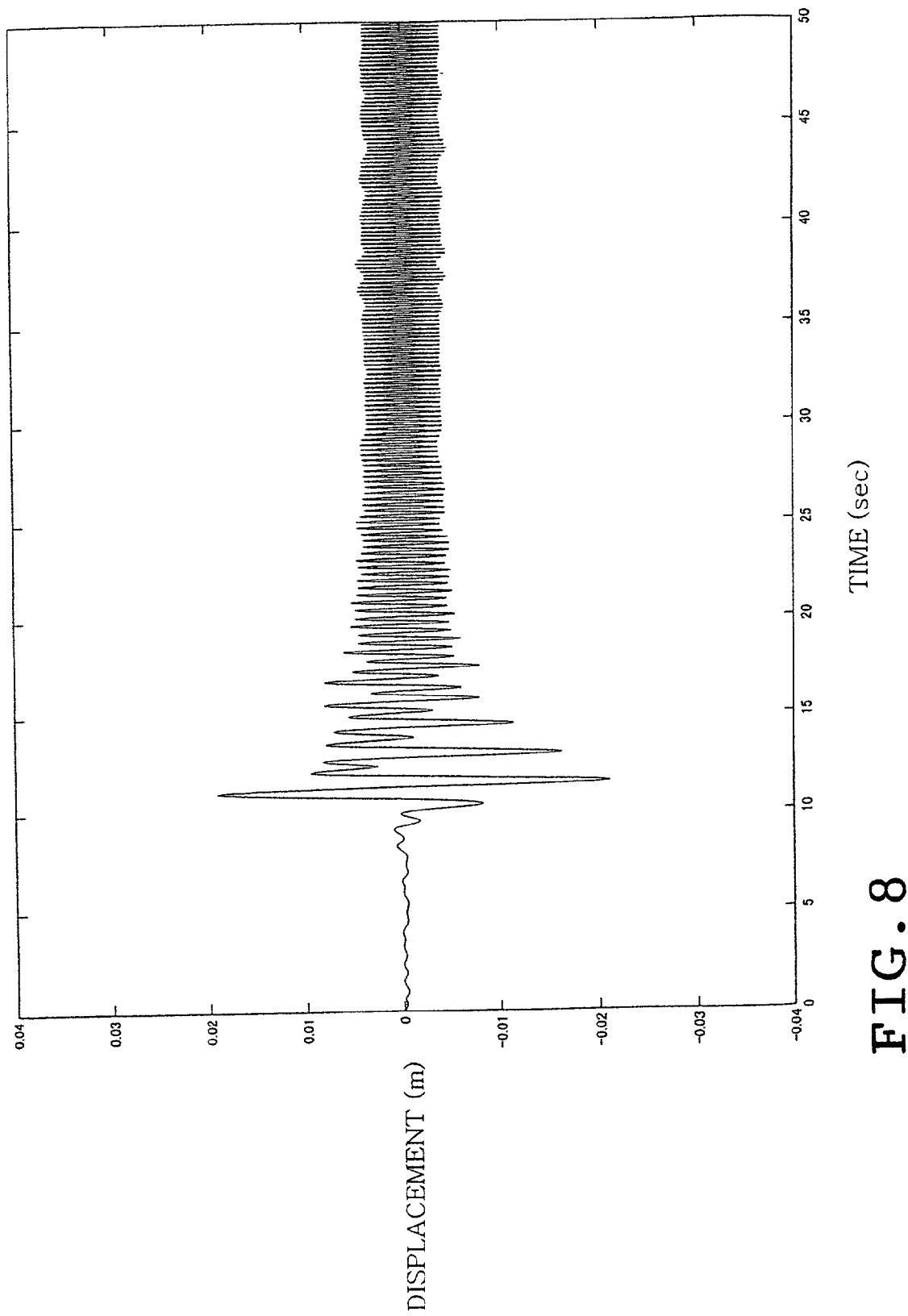
FIG. 8 is a graph showing swinging (displacement) of the rotating tub upon start of a dehydration operation in the embodiment.
Figure 9:
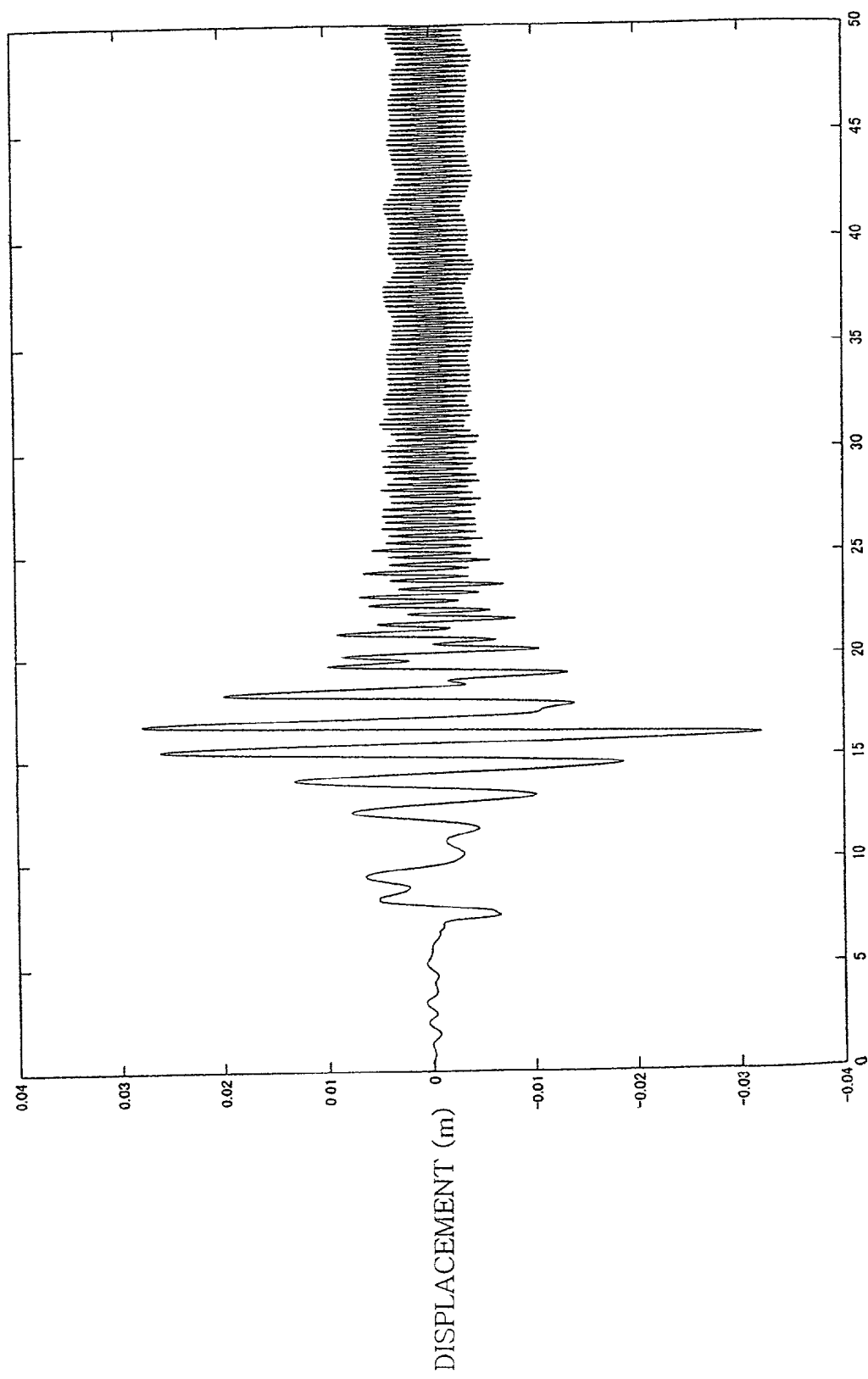
FIG. 9 is a graph similar to FIG. 8, showing the prior art.
Figure 10:
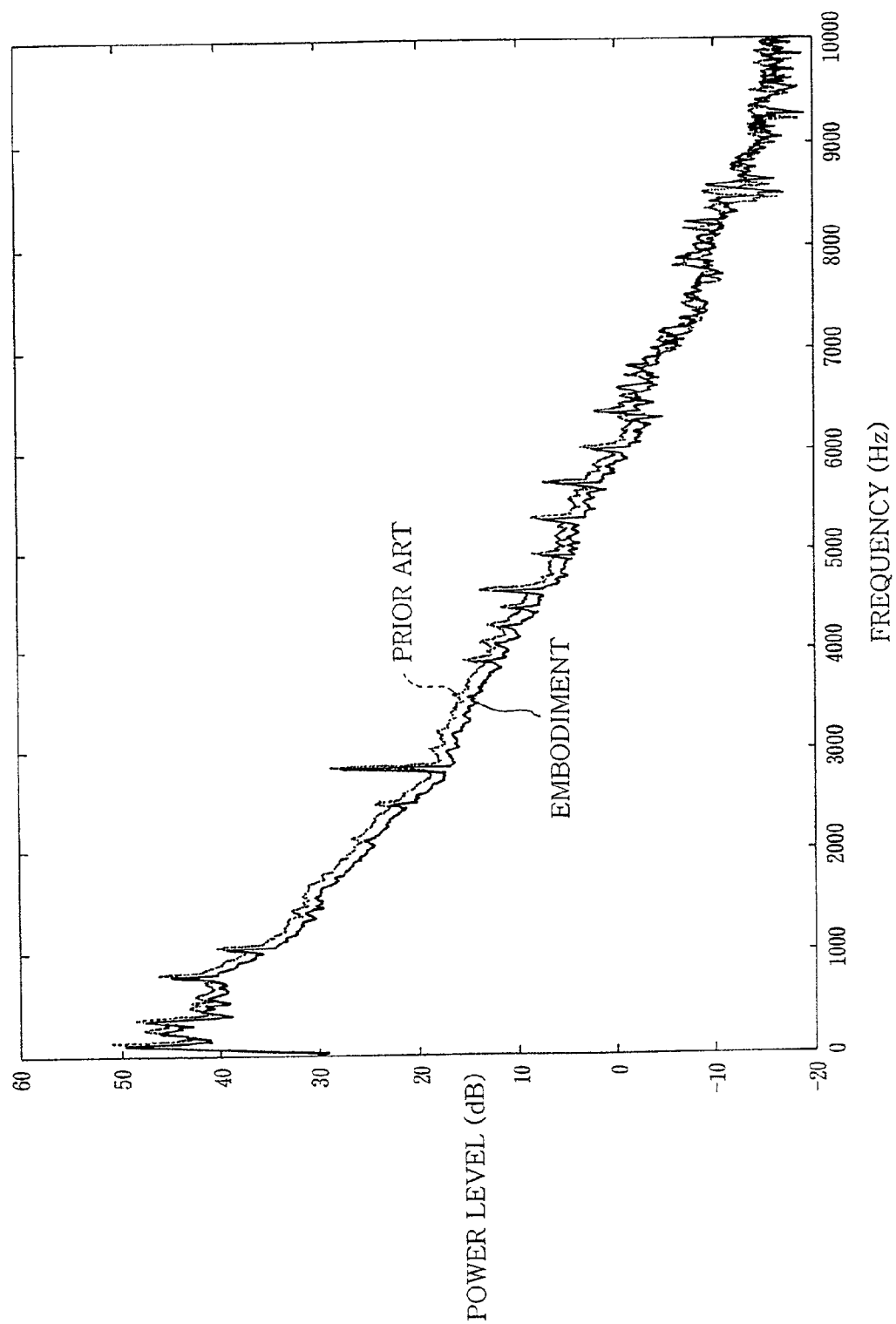
FIG. 10 is a graph showing comparison of noise levels in the prior art and the present embodiment respectively.

FIGS. 8 and 9 show the swinging (displacement) of the tub 15 upon start of the dehydration operation in the embodiment and in the prior art respectively. In the embodiment as shown in FIG. 8, the swinging with lower levels reaches its peak values at earlier times and ends more rapidly than in the prior art as shown in FIG. 9. In other words, since the variations in the rotational speed are reduced, vibration produced during the operation can be reduced. Furthermore, FIG. 10 shows comparison of noise levels in the prior art and the present embodiment respectively. As obvious from FIG. 10, the noise level is reduced by 2 dB at the most by the foregoing arrangement of the embodiment.

Figure 11:
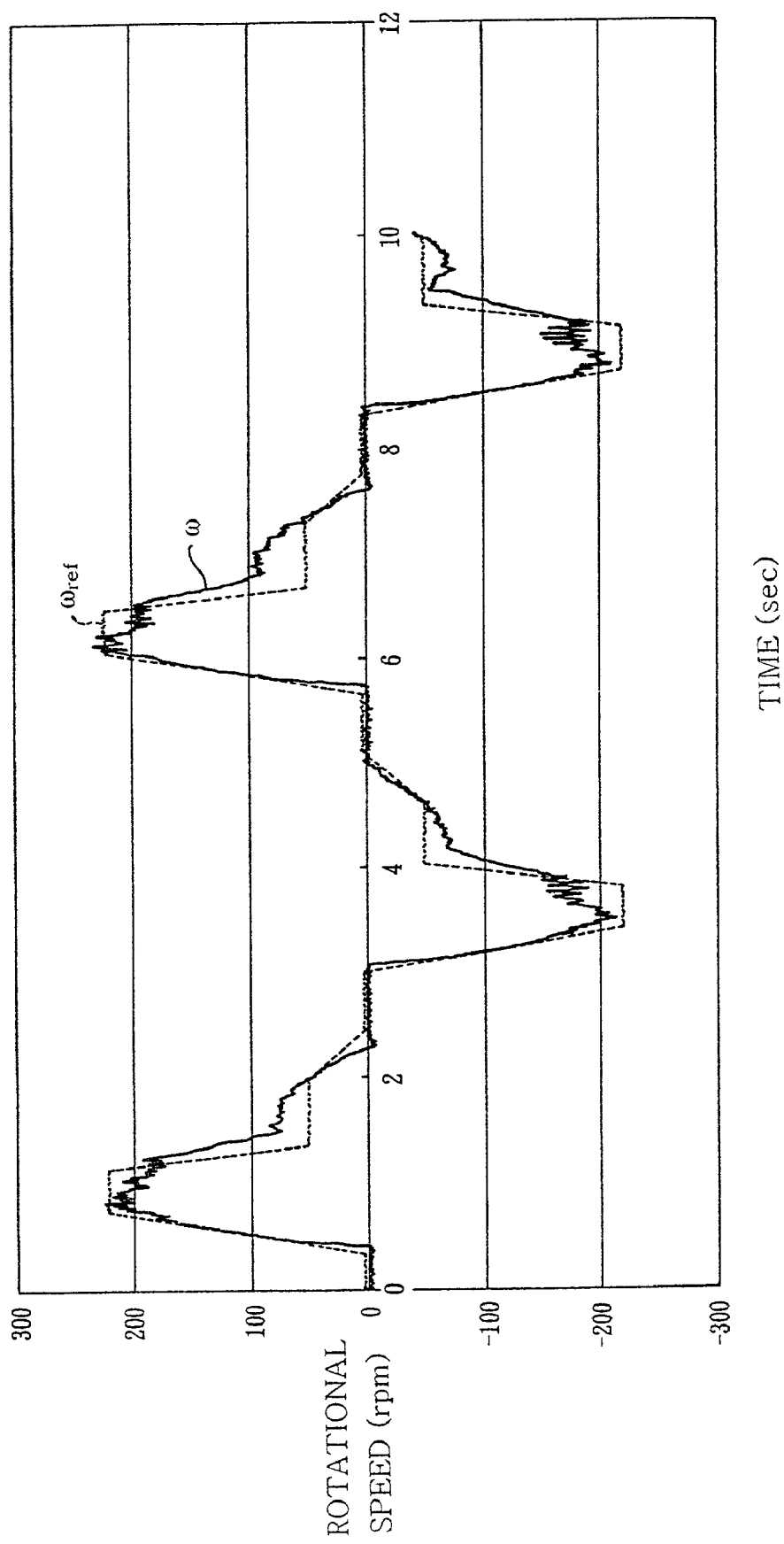
FIG. 11 is a graph showing a target speed command $\omega_{ref}$ and motor speed $\omega$ in a wash operation.
Figure 12:
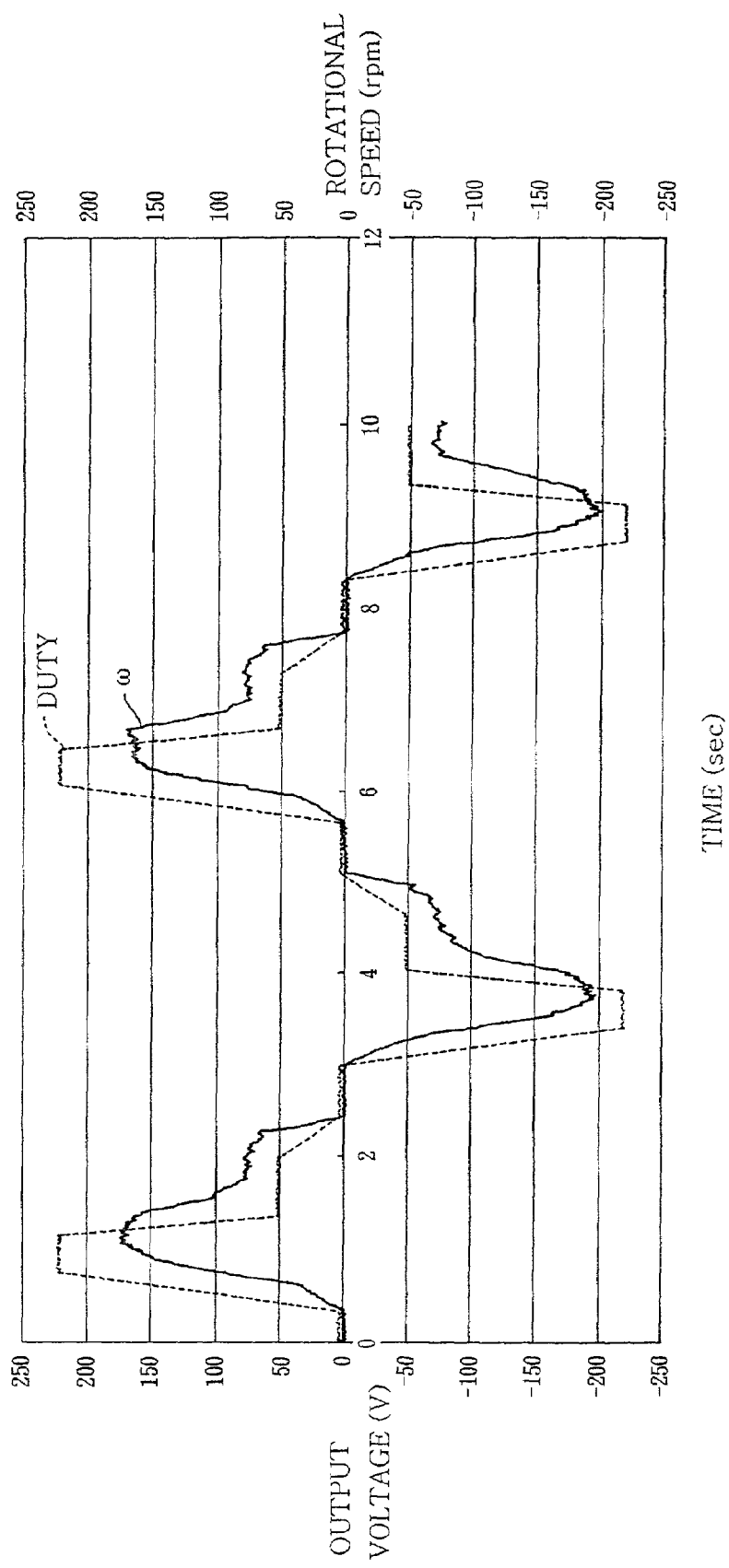
FIG. 12 is a graph showing a duty command Duty delivered by a PI control section and the motor speed $\omega$ in the prior art.
Figure 13:
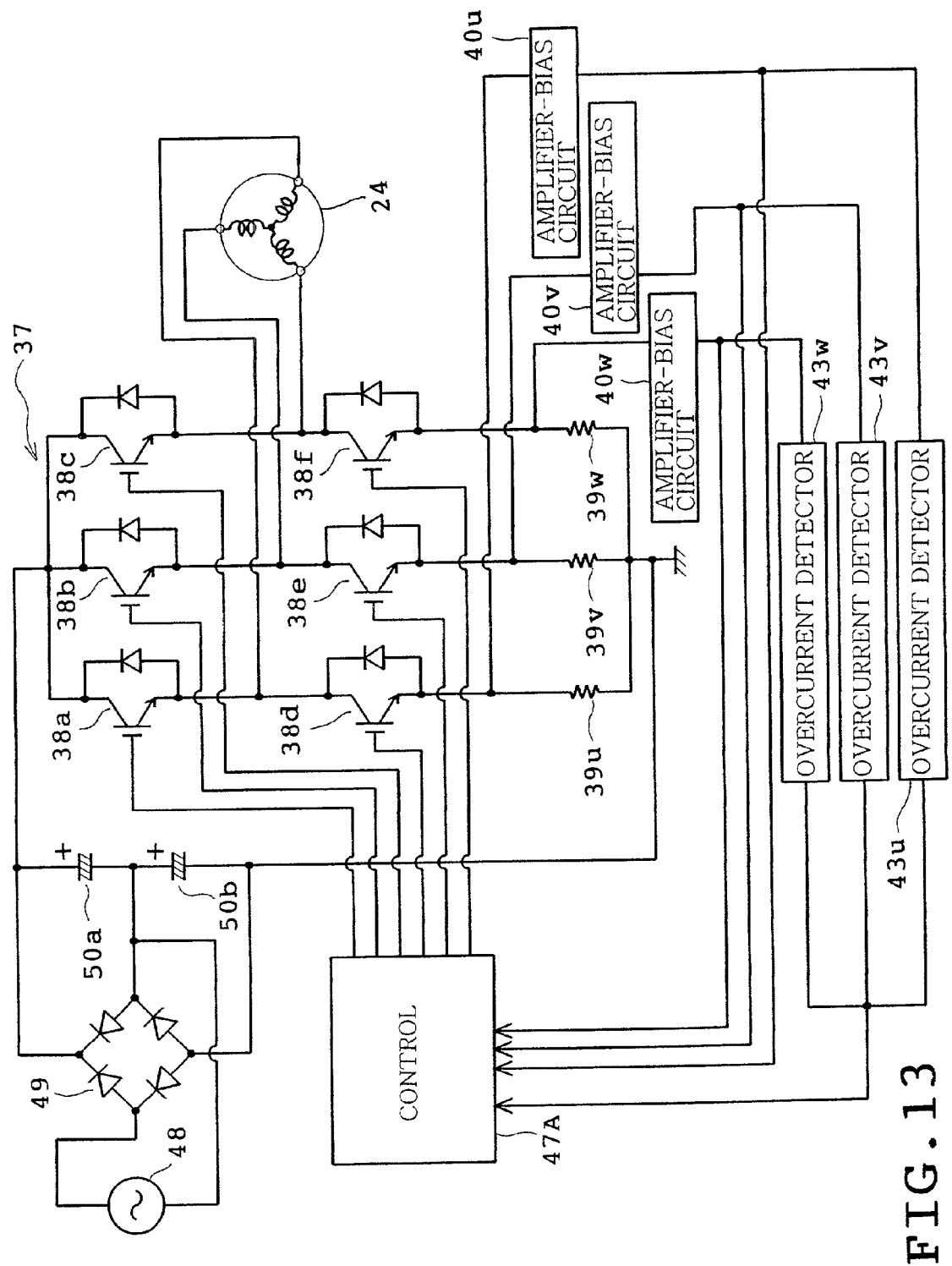
FIG. 13 is a circuit diagram similar to FIG. 2, showing the electrical arrangement of the washing machine of a second embodiment in accordance with the present invention.

FIG. 11 shows the target speed command $\omega_{ref}$ and the rotational speed $\omega$ of the motor 24 in the wash operation in the embodiment. FIG. 12 shows the duty command DUTY delivered by the PI control and the motor speed $\omega$ in the prior art. As obvious from these graphs, the rotational speed $\omega$ desirably follows the target speed command $\omega_{ref}$ and the rotational variations are small and stable in the embodiment.

As obvious from the foregoing, when the motor 24 develops torque for each of the wash, rinse and dehydration operations in the washing machine 11, the current flowing into the motor is detected by the shunt resistors 39u and 39v disposed at the sides of the emitters of the lower arm side IGBTs 38d and 39f composing the inverter circuit 37 respectively. DSP 45 performs the vector control for the motor 24 on the basis of the detected currents $I_u$ and $I_v$ so that the developed torque becomes optimum for each of the wash, rinse and dehydration operations. More specifically, since the motor torque can directly be controlled in proportion to the q-axis current obtained by the vector control, the control manner of the foregoing embodiment can improve the responsibility as compared with the prior art. Consequently, a vibration component of a short cycle produced during the operation can effectively reduced and accordingly, noise and vibration can effectively be reduced. As a result, the cleaning performance of the washing machine can be improved since a size reduction of the outer cabinet is achieved, and energy saving is also achieved by reduction in useless driving force of the motor 24.

The shunt resistors 39u and 39v are used for the current detection in the foregoing embodiment. Thus, the current flowing into the motor 24 can be detected by a cost-effective arrangement without using an expensive current sensor such as a current transformer. Furthermore, currents flowing into two (U and V) of the three phases are detected and current flowing into the other phase is estimated on the basis of the detected currents. Consequently, the arrangement for the motor control can be simplified.

Furthermore, the motor speed is controlled in the PI control manner with the control period of 1 ms at the stage prior to the dq/αβ converter 32 substantially performing the torque control in the DSP 45. Accordingly, a predetermined speed can be obtained even when the load applied to the motor 24 varies, and the cleaning performance can be rendered stable. Furthermore, the current PI controls 31q and 31d also perform the PI control for current, delivering the q-axis and d-axis voltage command values $V_q$ and $V_d$ to the dq/αβ converter 32 Consequently, a suitable torque necessary for attainment of a predetermined speed can be obtained. Furthermore, the vector control is started at the time the motor speed is increased to 60 rpm. Consequently, the vector control can stably be performed with high precision.

Additionally, the overcurrent detector 43 is disposed at the output side of the amplifier-bias circuits 40u and 40v. When detecting the overcurrent flowing into the windings 24u to 24w of the motor 24, the overcurrent detector 43 delivers the detection signal to the microcomputer 46, so that the drive control of the motor 24 is interrupted. Consequently, the overcurrent can be detected for the safety even when at least one of the phases short-circuits.

FIGS. 13 to 16 illustrate a second embodiment of the invention. Identical or similar parts in the second embodiment are labeled by the same reference symbols as those in the first embodiment. Description of these parts is eliminated and only the difference of the second embodiment from the first embodiment will be described. In the second embodiment, a shunt resistor 39w and amplifier-bias circuit 40w for the phase W are added for the current detection. Thus, the current detection is performed for each of the three phases. Furthermore, the diodes 42u and 42v are eliminated in the second embodiment and three overcurrent detectors 43u, 43v and 43w are provided for the respective three phases. The overcurrent detectors 43u, 43v and 43w have output terminals connected in common to the input port of the control 47A.

Figure 14A:
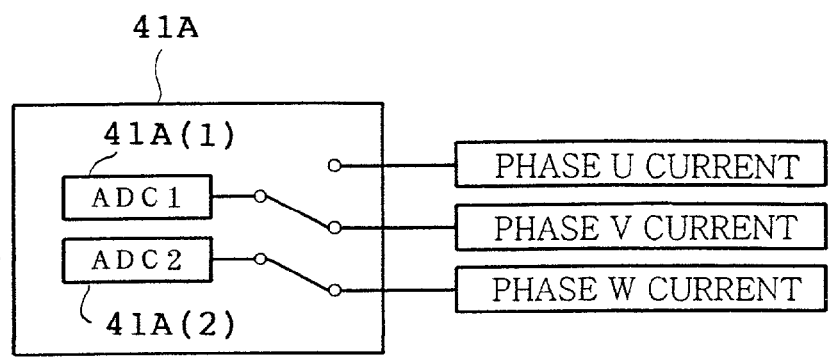
FIGS. 14A to 14C illustrate a manner in which an A/D converter switches input to a 2-channel converter.
Figure 14B:
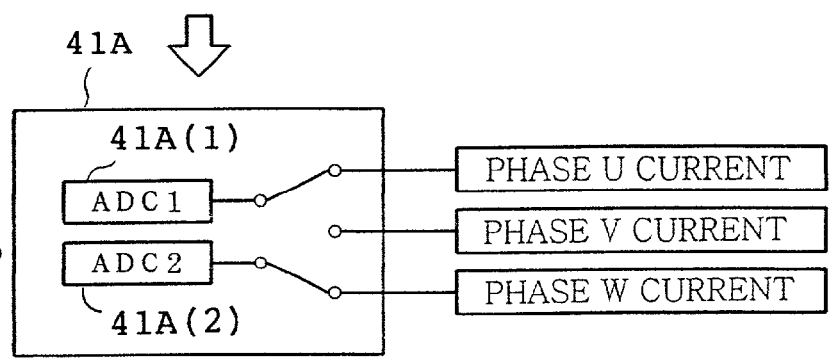
Figure 14C:
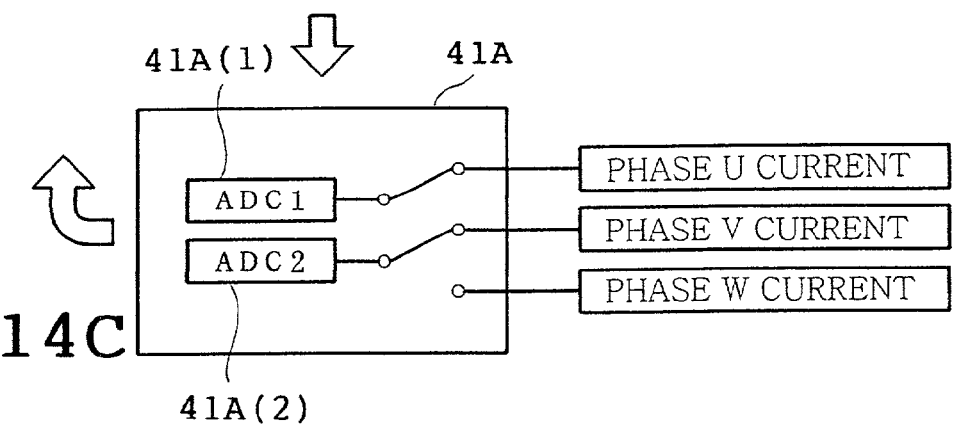

In the second embodiment, the overcurrent signals are low active and an output portion of each of the overcurrent detectors 43u, 43v and 43w has an open drain configuration. Furthermore, as shown in FIGS. 14A to 14C, the A/D converter 41A (current detector) of the control 47 includes two-channel converters 41A1 and 41B2 which are switched therebetween for three-phase inputs. The switching between the two channels is based on an energization phase angle (electrical angle) of the PWM signal delivered by the PWM signal forming section 36. The other arrangement and construction of the washing machine are the same as those in the first embodiment.

The operation of the washing machine will be described with reference to FIGS. 15A to 15E and 16. FIGS. 15A to 15E show phase voltages $V_{mu}$, $V_{mv}$ and $V_{mw}$ appearing on the respective phase windings in the case of two-phase modulated wave energization for the motor 24, and timing for detection of phase currents by the A/D converter 41A. For example, the phase U voltage is higher than the phase V and W voltages and shows a maximum level in a phase section from an electrical angle of ($\pi/6$) to ($5\pi/6$). The phase V and W currents are detected by the converters 41A1 and 41A2 respectively in this section. That is, the currents are detected in synchronization with turn-on of the lower arm side IGBTs 39e and 39f of the phases V and W respectively. Furthermore, the phase V voltage is higher than the phase U and W voltages in the following phase section from ($5\pi/6$) to ($3\pi/2$). The phase U and W currents are detected by the converters 41A1 and 41A2 respectively in this section. Additionally, the phase W voltage is higher than the phase U and V voltages in the further following section from ($3\pi/2$) to ($2\pi+\pi/6$). The phase U and V currents are detected in this section.

Figure 16:
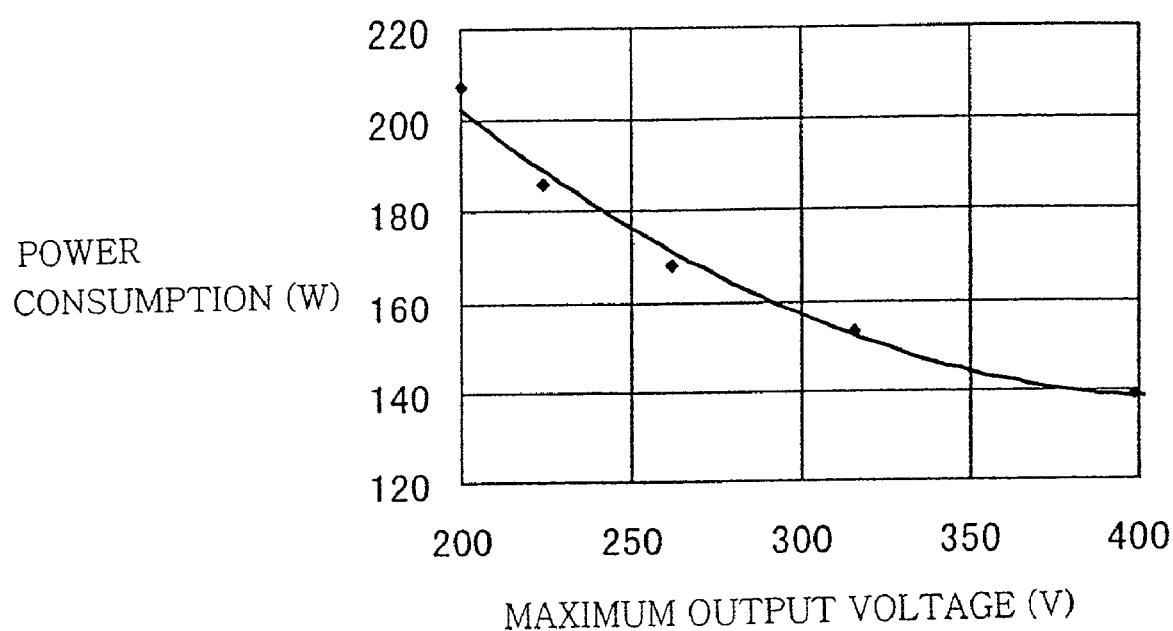
FIG. 16 is a graph showing the relationship between motor maximum output voltage (phase voltage) and power consumption.

More specifically, in order that current may be detected, the lower arm side IGBT 38 needs to be turned on so that the phase current flows into the resistor 39. Accordingly, when the current of one of the three phases which shows the maximum level of phase voltage is detected, the maximum value of the phase voltage is reduced such that the current flowing into the motor winding is increased. As a result, a resistance loss is increased and accordingly, the motor efficiency is reduced. FIG. 16 shows the relationship between maximum output voltage (phase voltage) and power consumption of the motor 24. For example, in the current detection with respect to the phase showing the maximum level, an applied voltage needs to be limited to about 250 V when a drive voltage of the inverter circuit 38 is about 280 V. In view of this, the maximum value of phase voltage is not limited when currents are detected with respect to two of the three phases in which the phase voltages do not show the maximum level. Consequently, the motor efficiency can be improved.

In the arrangement of the second embodiment, the A/D converters 41A1 and 41A2 detect the currents with respect to two of the three phases in which the phase voltages do not show the maximum level. Accordingly, in the section in which the phase voltage shows the maximum level, the duty of the PWM signal can be set at 100% without turn-on of the lower arm side IGBT 38. Consequently, the efficiency of the motor 24 can be improved. For example, a reduction of about 15 W can be achieved in the power consumption when the drive voltage of the inverter circuit 38 is about 280 V. The foregoing can be applied to a case of the sinusoidal wave energization by way of the three-phase modulated wave.

Figure 17:
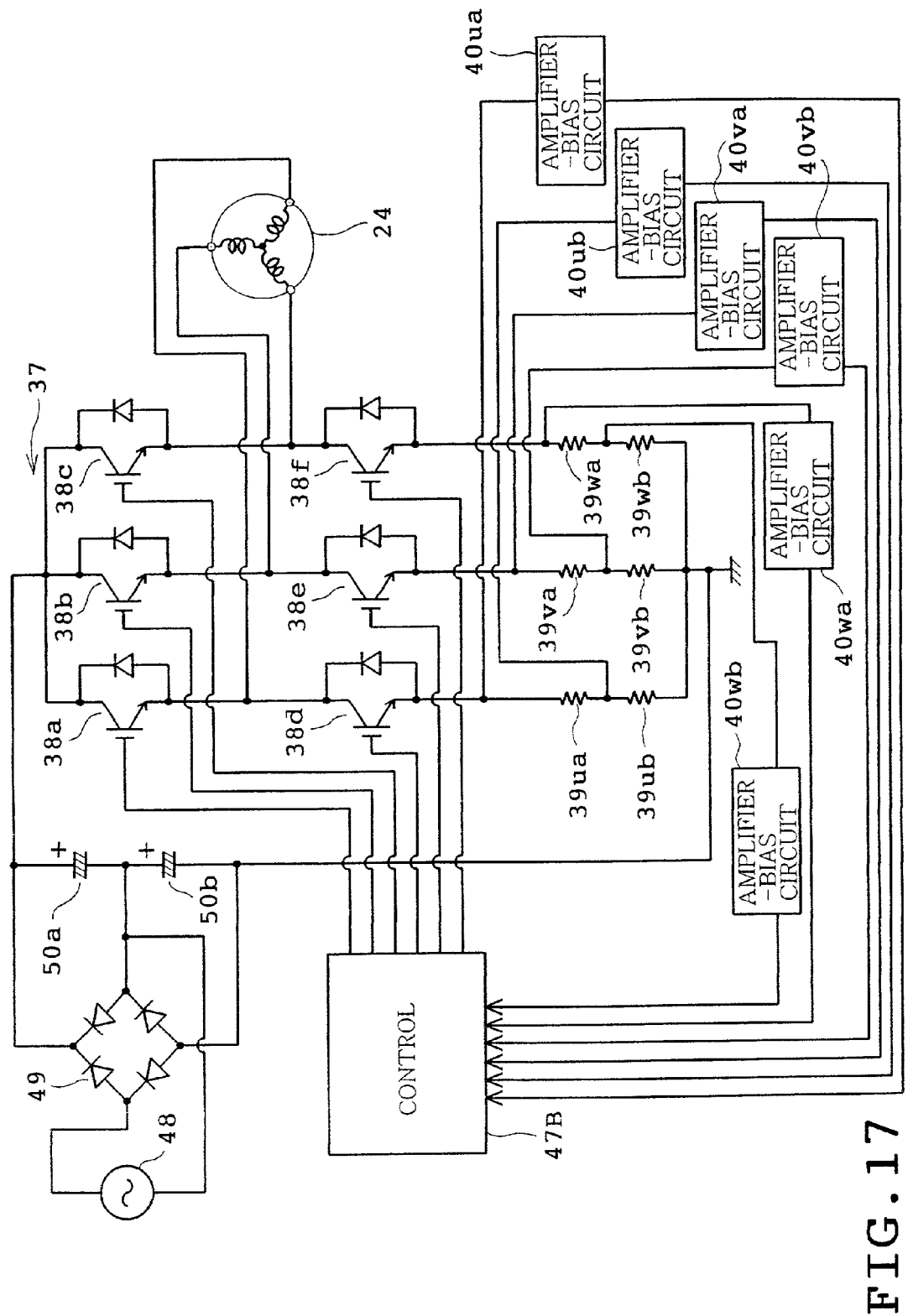
FIG. 17 is a circuit diagram showing similar to FIG. 2, showing the electrical arrangement of the washing machine of a third embodiment in accordance with the present invention.
Figure 18:
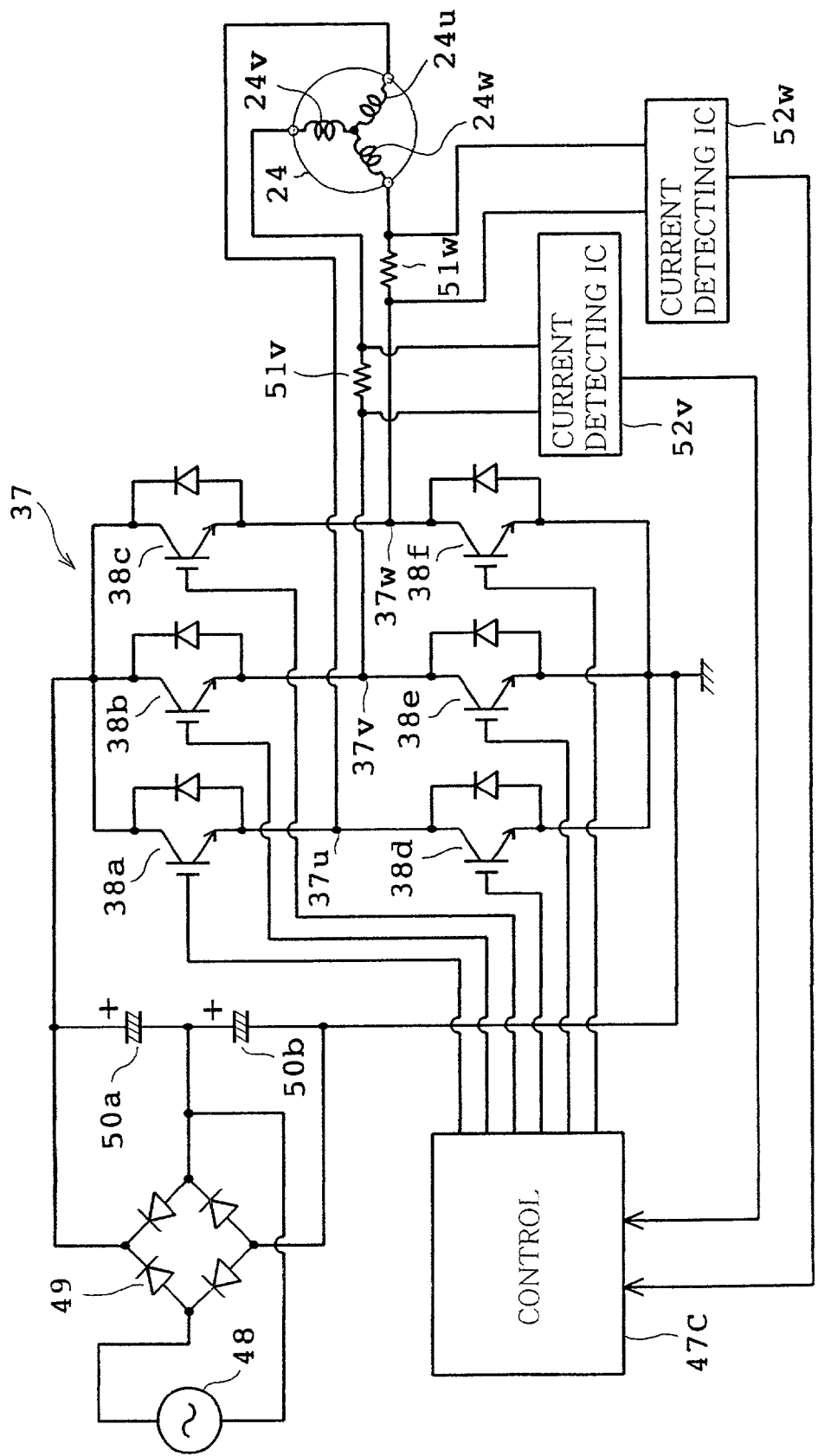
FIG. 18 is also a circuit diagram similar to FIG. 2, showing the electrical arrangement of the washing machine of a fourth embodiment in accordance with the present invention.

FIG. 17 illustrates a third embodiment of the invention. Only the difference of the third embodiment from the first embodiment will be described. In the third embodiment, two series connected shunt resistors are connected to the lower arm side of the inverter circuit 37 for each phase. More specifically, the phase U has two series connected resistors 39ua and 39ub, the phase V has two series connected resistors 39va and 39vb, and the phase W has two series connected resistors 39wa and 39wb. The amplifier-bias circuits 40ua, 40va and 40wa have input terminals connected to nodes between the emitters of the IGBTs 38d, 38e and 38f and the resistors 39ua, 39va and 39wa respectively. Furthermore, the amplifier-bias circuits 40ub, 40vb and 40wb have input terminals connected to nodes of the respective series circuits of resistors. Each amplifier-bias circuit has an output terminal connected to an input port of the control 47B (current detector).

The load applied to the motor 24 varies according to an operating mode of the washing machine 11, so that an amount of current flowing into the windings 24u, 24v and 24w is increased or decreased. The current detection is carried out at the side of the resistors 39ub, 39vb and 39wb when the amount of current is relatively large. The current detection is carried out at the side of the resistors 39ua, 39va and 39wa when the amount of current is relatively small.

In the third embodiment as described above, the control 47B switches the resistance value of the detecting resistor according to the amount of current flowing into the motor windings. Consequently, the current can precisely be detected even in the washing machine in which the load variation is usually large.

FIGS. 18 to 21 illustrate a fourth embodiment of the invention. The shunt resistors 39u, 39v and 49w are eliminated in the fourth embodiment. Two shunt resistors 51v and 51w are interposed between the output terminals 37v and 37w of the inverter circuit 37 and motor windings 24v and 24w respectively. Two current detecting ICs 52v and 52w have input terminals connected between both ends of the resistors 51v and 51w respectively. For example, product IR2717 manufactured by International Rectifier may be used as the current detecting ICs 52v and 52w. The current detecting ICs 52v and 52w deliver PWM signals according to terminal voltages of the resistors 51v and 51w to the control 47C with a carrier wave of 40 kHz respectively as shown in FIGS. 19A and 19B. More specifically, when the potential difference between input terminals $V_{in}+$ and $V_{in}-$ changes between a range between −260 mV and +260 mV, each PWM signal is delivered with its duty ratio changing in a range between 93% and 7%. The PWM signals delivered by the current detecting ICs 52v and 52w are supplied to the input port of the control 47C.

FIGS. 20A and 20B show a waveform of PWM signal delivered by a current detecting IC 52 and changes in a count value of a counter (not shown) provided in DSP (not shown) of the control 47C respectively. FIG. 21 shows a calculation processing performed by DSP. When interrupted by a trailing edge of the PWM signal delivered by each of the current detecting ICs 52v and 52w, DSP performs a subroutine XINTxSVR as shown in FIG. 21.

Count values of the counter are latched by capture units CAPxFIFO (old) and CAPxFIFO (new) in synchronization with rise and fall of the PWM signal respectively. Upon start of the processing in FIG. 21, data latched by the two capture units CAPxFIFO (old) and CAPxFIFO (new) are input to registers AR5 and AR6 respectively (step D). DSP then calculates an OFF period IxDelta1 of the PWM signal (step D2). In this case, the value of the register AR5 is substituted for a variable IxTime1 so that the OFF period IxDelta1 is obtained by the following equation:

$$IxDelta1 = IxTime1 - IxTime2 \qquad (3)$$

A count value obtained in synchronization with fall of the PWM signal in the previous period is substituted for IxTime2 at step D3 as will be described.

DSP then calculates the ON period IxDelta2 (step D3). In this case, the value of the register AR6 is substituted for the variable IxTime2 so that the ON period IxDelta2 is calculated as follows:

$$Ix\text{Delta}2 = Ix\text{Time}2 - Ix\text{Time}1 \qquad (4)$$

DSP further calculates a current value Ix (step D4). The current value Ix is obtained by dividing the ON period IxDelta2 by the sum of the OFF period IxDelta1 and the ON period IxDelta2 as follows:

$$Ix = Ix\text{Delta}2/(Ix\text{Delta}1 + Ix\text{Delta}2) \qquad (5)$$

In the fourth embodiment, as described above, the shunt resistors 51v and 51w are interposed between the output terminals 37v and 37w of the inverter circuit 37 and motor windings 24v and 24w respectively. The current detecting ICs 52v and 52w are connected to both ends of the resistors 51v and 51w respectively. The currents are detected on the basis of the PWM signals delivered by the current detecting ICs 52v and 52w respectively. Consequently, the same effect can be achieved from the fourth embodiment as from the first or second embodiment.

In modification, the vector control may be carried out at least for the wash and dehydration operations. Furthermore, the period of the speed control should not be limited to 1 ms. A sufficient noise or vibration reduction effect can be achieved when the period is set in a range between 1 and 50 ms. Alternatively, the period may be set to be within one twentieth of a period corresponding to a natural frequency of the vibration system.

Furthermore, a control gain used for the speed PI control may be changed according to a rotational speed of the motor 24. For example, when the motor speed substantially reaches the natural frequency of the vibration system comprising the tub 15, the value of the control gain is set so as to be increased so that the PI control acts more intensely. Consequently, vibration can effectively be reduced. In this case, the control gain used for the speed PI control may be changed between the wash operation and the dehydration operation. More specifically, since the drive condition of the motor 24 differs between the wash operation and the dehydration operation to a large extent, the vibration can effectively be reduced when the control gain is set at suitable values according to the drive conditions. More specifically, the speed increase and reduction are more suddenly in the wash operation than in the dehydration operation and furthermore, the output torque becomes larger in the wash operation than in the dehydration operation. Consequently, an integration gain is preferably set at a larger value.

A current transformer may be used for the motor current detection.

Three or more current detecting resistors may be connected in series with one another in the third embodiment. Furthermore, in the fourth embodiment, a plurality of shunt resistors may be serially connected in the same manner as in the third embodiment, and current detecting IC resistors whose number is equal to that of the resistors are provided so that a detecting point is changed according to an amount of current.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A washing machine comprising:
   a brushless motor that develops torque used for wash, rinse and dehydration operations;
   a current detector configured to detect current flowing into the motor;
   a torque controller configured to perform a vector control for the motor based on the current detected by the current detector so that the torque developed by the motor is optimum for at least each of the wash and dehydration operations; and
   an inverter circuit configured to drive the motor, the inverter circuit including a plurality of upper arm side switching elements and a plurality of lower arm side switching elements, wherein the current detector detects current flowing through a shunt resistor connected in series to the lower arm side switching elements.

2. A washing machine according to claim 1, wherein the motor has three phases, and the current detector detects current with respect to two of the three phases in which neither phase voltage shows a maximum level, on the basis of an exciting electrical angle with respect to the motor.

3. A washing machine according to claim 1, wherein a plurality of shunt resistors are connected in series to the lower arm side switching elements so as to form a series circuit, and the current detector switches a detecting position in the series circuit based on a load condition.

4. A washing machine according to claim 1, further comprising a speed controller provided at a stage previous to the torque controller for performing a proportional integral (PI) control for a motor speed based on a speed command and a speed of the motor obtained from the current detected by the current detector.

5. A washing machine according to claim 4, wherein the speed controller delivers q-axis and d-axis current command values to the torque controller, and the torque controller performs a proportional integral (PI) control based on the q-axis and d-axis current command values and q-axis and d-axis current values of the motor obtained from the current detected by the current detector, thereby generating q-axis and d-axis voltage command values.

6. A washing machine according to claim 4, wherein the speed controller changes a control gain used in the PI control according to a motor speed.

7. A washing machine according to claim 4, further comprising a rotating tub and an agitator, wherein the speed controller changes a control gain used in the PI control at least with respect to each of a wash operation in which the agitator is rotated and a dehydration operation in which the rotating tub is rotated.

8. A washing machine according to claim 4, wherein the speed controller has a control period set to be less than 50 ms.

* * * * *